United States Patent
Wiktor

(10) Patent No.: US 11,273,602 B2
(45) Date of Patent: Mar. 15, 2022

(54) COUPLED POSITIONERS

(71) Applicant: Peter Jan Wiktor, Phoenix, AZ (US)

(72) Inventor: Peter Jan Wiktor, Phoenix, AZ (US)

( * ) Notice: Subject to any disclaimer, the term of this patent is extended or adjusted under 35 U.S.C. 154(b) by 302 days.

(21) Appl. No.: 16/538,037

(22) Filed: Aug. 12, 2019

(65) Prior Publication Data

US 2020/0047333 A1 Feb. 13, 2020

Related U.S. Application Data

(60) Provisional application No. 62/773,156, filed on Nov. 29, 2018, provisional application No. 62/717,295, filed on Aug. 10, 2018.

(51) Int. Cl.
*B25J 18/00* (2006.01)
*B23Q 1/54* (2006.01)
(Continued)

(52) U.S. Cl.
CPC .............. *B29C 64/227* (2017.08); *B23Q 1/54* (2013.01); *B25J 9/0003* (2013.01); *B25J 9/003* (2013.01);
(Continued)

(58) Field of Classification Search
CPC . B23Q 1/54; B23Q 1/5462; B23Q 5/40; B25J 18/00; B25J 9/0003; B25J 9/003;
(Continued)

(56) References Cited

U.S. PATENT DOCUMENTS 4,341,502 A 7/1982 Makino
4,976,582 A 12/1990 Clavel
(Continued)

FOREIGN PATENT DOCUMENTS

WO WO-03106115 A1 * 12/2003 ............... B23Q 1/48
WO WO-2019069077 A1 * 4/2019 ............... G09B 9/04

OTHER PUBLICATIONS

N. Seward et al: "A New 6-DOF Parallel Robot With Simple Kinematic Model", Proc.IEEE Int. Conf. on Robotics and Automation, Hong Kong, China, published 2014, 10.1109/ICRA.2014.6907449, 6 Pages.
(Continued)

*Primary Examiner* — Hunter B Lonsberry
*Assistant Examiner* — Daniel L Greene
(74) *Attorney, Agent, or Firm* — Whitmyer IP Group LLC

(57) ABSTRACT

A manipulator system having a positioner having a primary rail, a first coupling linkage, and a second coupling linkage. The first coupling linkage couples the primary rail to a base and positions the primary rail along a first plane. The system has another positioner having a secondary rail, a third coupling linkage, and a fourth coupling linkage. The third coupling linkage couples the secondary rail to the base and positions the secondary rail along a second plane which is parallel to the first plane. A common link couples to the primary and secondary rails via linkages. Each of the second and fourth coupling linkages includes a joint for linear motion along the respective rail, and a revolute joint for relative pivoting between the respective rail and the common link. A position and orientation of the common link are adjustable by the joints and revolute joints.

27 Claims, 27 Drawing Sheets

(51) Int. Cl.
  *B29C 64/227* (2017.01)
  *B25J 9/00* (2006.01)
  *B25J 9/10* (2006.01)
  *B33Y 30/00* (2015.01)
  *B29C 64/20* (2017.01)
  *B29C 64/25* (2017.01)

(52) U.S. Cl.
  CPC .............. *B25J 9/106* (2013.01); *B25J 18/00* (2013.01); *B29C 64/20* (2017.08); *B29C 64/25* (2017.08); *B33Y 30/00* (2014.12)

(58) Field of Classification Search
  CPC ......... B25J 9/0033; B25J 9/106; B29C 64/20; B29C 64/227; B29C 64/25; B33Y 30/00
  See application file for complete search history.

(56) References Cited

U.S. PATENT DOCUMENTS

| | | | |
|---|---|---|---|
| 6,557,432 B2 * | 5/2003 | Rosheim | B25J 17/0266 403/203 |
| 7,300,240 B2 | 11/2007 | Brogardh | |
| 7,950,306 B2 | 5/2011 | Stuart | |

OTHER PUBLICATIONS

D. Stewart: "A Platform With Six Degress of Freedom", Proc IMechE, Part A: J Power and Energy, vol. 180, part 1, No. 15, published 1965-1966, pp. 371-386.

X. Liu, et al: On the Analysis of a New Spatial Three-Degrees-of-Freedom Parallel Manipulator. IEEE Trans of Robotics and Automation, vol. 17, No. 6, published Dec. 2001, pp. 959-968.

C. Gosselin: "Compact Dynamic Models for the Tripteron and Quadrupteron Parallel Manipulators", Proc. IMechE, vol. 223, part 1, published 2009, pp. 1-11.

X. Xiao, et al: "Configuration Analysis and Design of a Multidimensional Tele-Operator Based on a 3-P(4S) Parallel Mechanism", J Intell Robot Syst, vol. 90, published 2018, pp. 339-348.

V.E. Gough et al: Contribution to discussion of paper on research in automobile stability, control and tyre performance, Proc. Auto Div. Inst. Mech Eng, vol. 171, published 1957, pp. 392-395. 4 Pages.

Craig, J.J.: "Introduction to robotics: mechanics and control", Addison-Wesley, Silma, Inc., Reading, Mass., published 1989; pp. 374-376. 5 Pages.

X.Z. Zheng, et al: "Kinematic Analysis of a Hybrid Serial-Parallel Manipulator", Int J Adv Manuf Technol, vol. 23, published 2004, pp. 925-930.

P. Wenger et al: "Kinematic Analysis of a New Parallel Machine Tool: The Orthoglide", 7th International Symposium on Advances in Robot Kinematics, Slovenia, published Jun. 2000, pp. 1-11.

S. Carlo et al:"Kinematic Analysis and Trajectory Planning of the Orthoglide 5-Axis", IDETC/CIE, published Aug. 2-5, 2015, Boston, USA. pp. 1-10.

X. Kong et al: "Kinematics and Singularity Analysis of a Novel Type of 3-CRR 3-DOF Translational Parallel Manipulator" Int. J of Robotics Research, vol. 21, No. 9, published Sep. 2002, pp. 791-798.

T.K. Tanev: "Kinematics of a Hybrid (parallel-serial) Robot Manipulator", Mech and Mach Theory, Central Laboratory of Mechatronics and Instrucmentation, Bulgarian Academy of Sciences. Sofia, Bulgaria, vol. 35, published 2000, pp. 1183-1196.

F. Gao et al: "New Kinematic Structures for 2-, 3-, 4- and 5-DOF Parallel Manipulator Designs", Mech and Mach Theory, vol. 37, published 2002, pp. 1395-1411.

M. Weck et al.: "Parallel Kinematic Machine Tools—Current State and Future Potentials" Annals of the CIRP, vol. 51, No. 2, published 2002 pp. 671-681.

J.P. Merlet: "Parallel Robots" Second Edition, vol. 128, published 2006, Springer, Dordrecht, The Netherlands 417 Pages.

D.L. Pieper: "The Kinematics of Manipulators Under Computer Control", Ph, D. Thesis, Stanford University, Oct. 24, 1968 Computer Science Department, Stanford University, 174 Pages.

B. Siciliano, et al: The Tricept Robot: Inverse Kinematics, Manipulability Analysis and Closed-Loop Direct Kinematics Algorithm, Robotica, vol. 17, publised 1999 United Kingdom, Cambridge University Press, pp. 437-445.

F. Pierrot: "Towards Non-Hexapod Mechanisms for High Performance Parallel Machines", Proceedings of 26th Annual Conference od the IEEE, IECON 2000, Nagoya, vol. 1, pp. 229-234.

X. Kong et al: "Type Synthesis of 5-DOF Parallel Manipulators Based on Screw Theory", Journal of Robotic Systems, vol. 22, No. 10, published May 2005, pp. 535-547.

V.E. Gough et al: "Universal tyre test machine", Proc. 9th Intern. Automobile technical congress FISITA, ImechE, London: Institution of Mechanical Engineers, vol. 117, pp. 117-262, published 1962. 34 Pages.

* cited by examiner

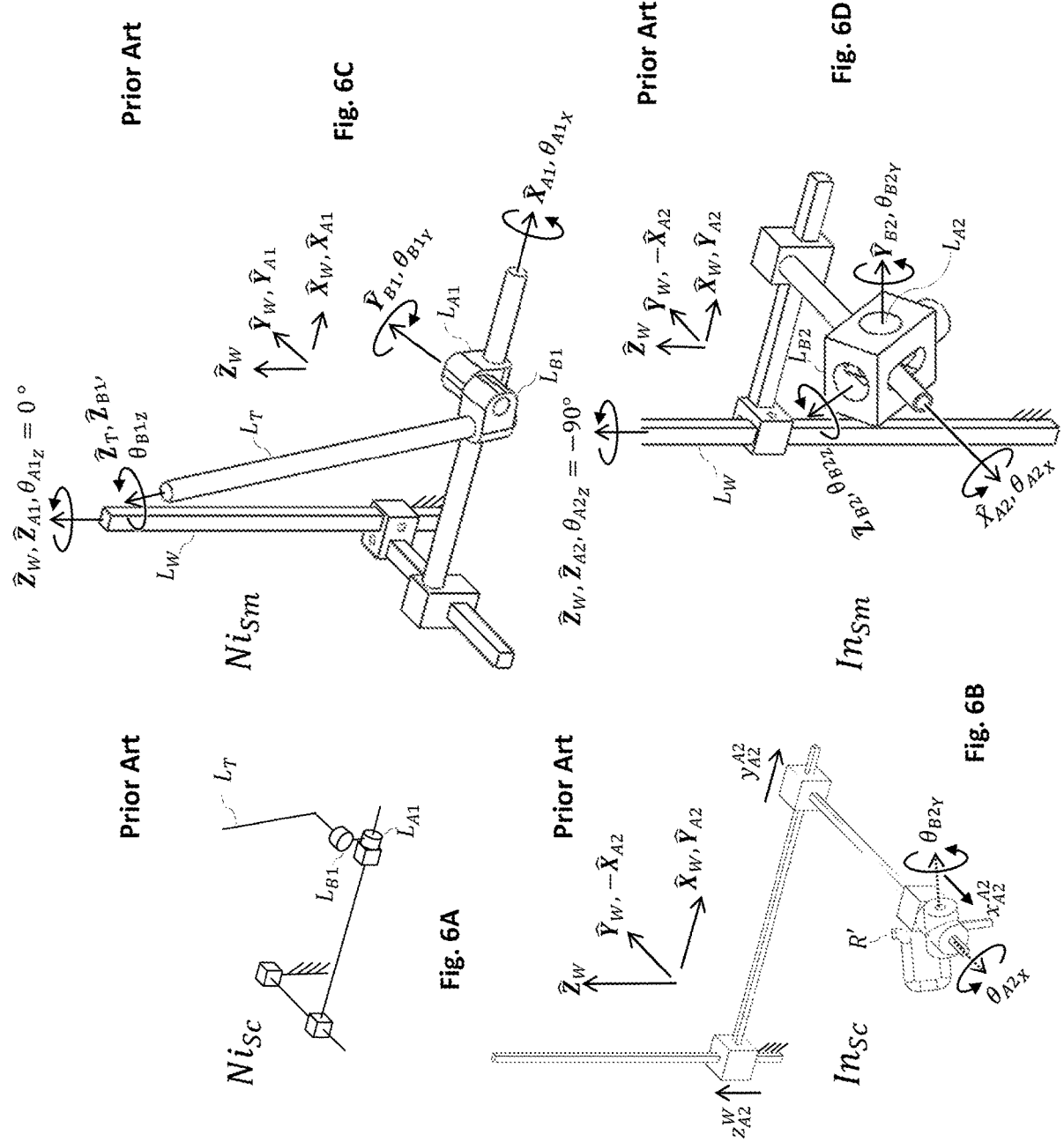

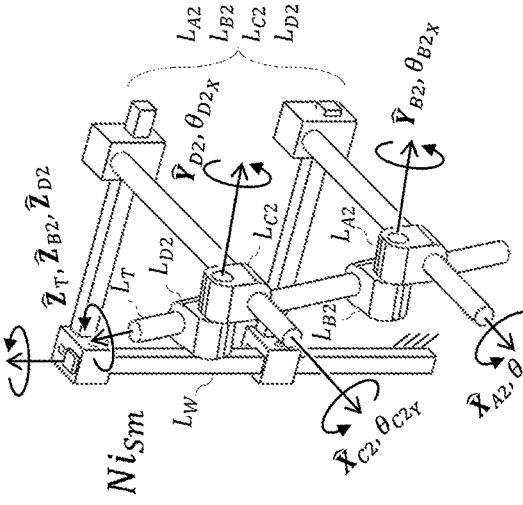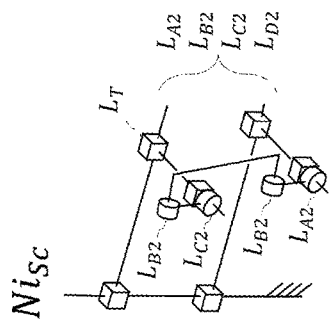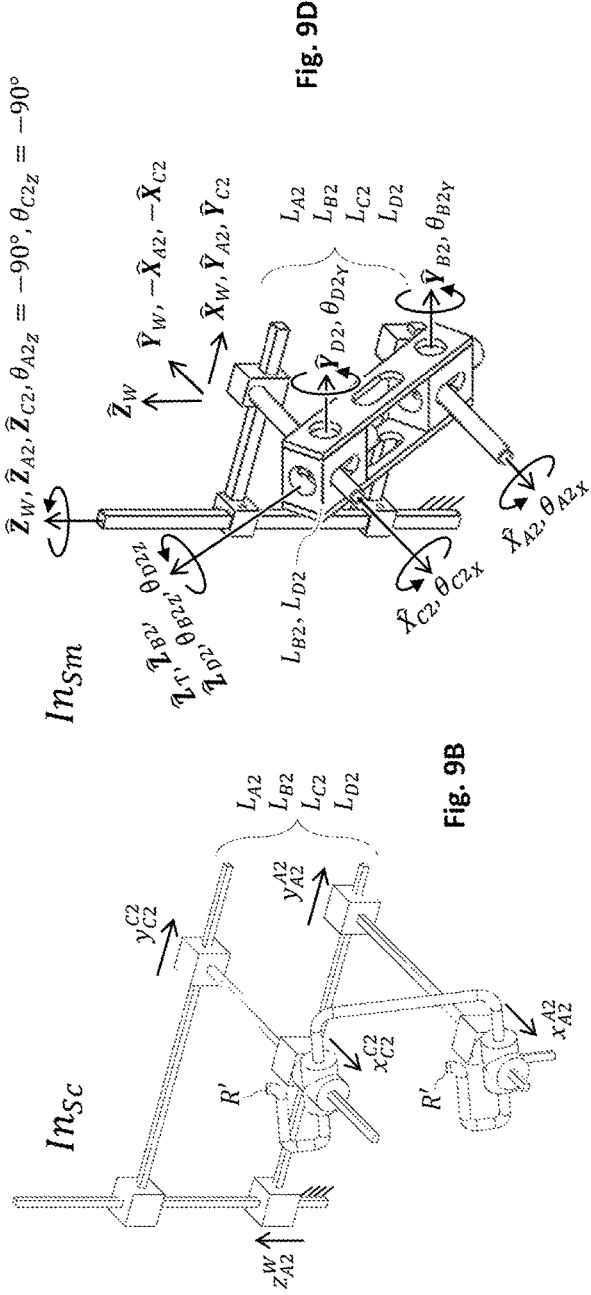

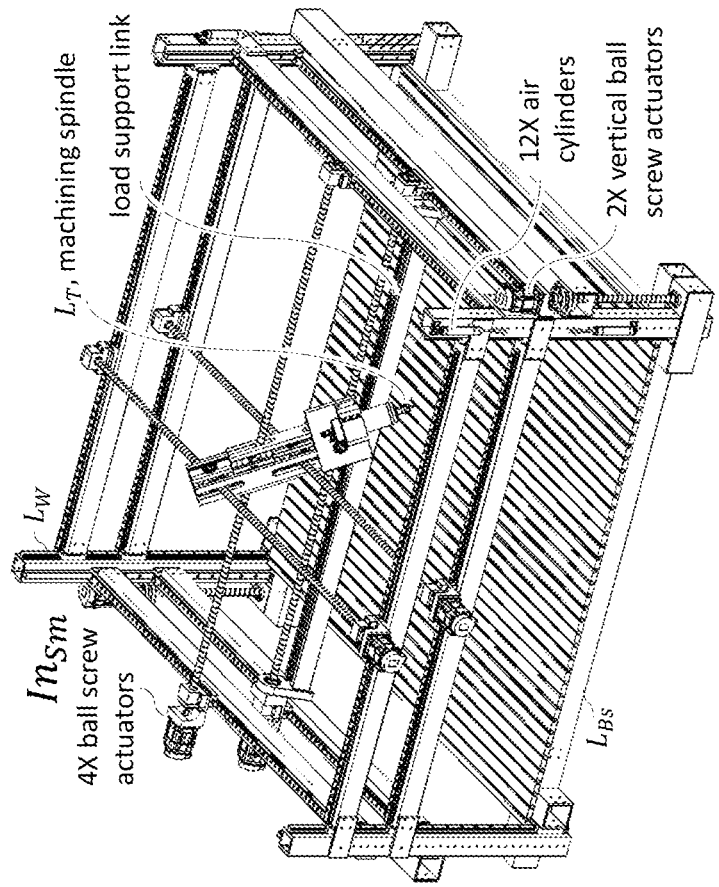
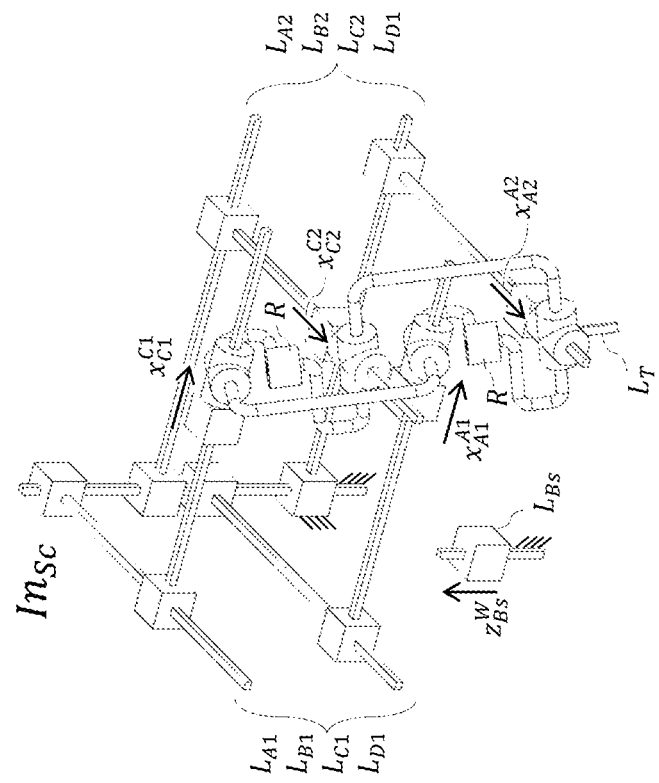
Fig. 11A
Fig. 11B

COUPLED POSITIONERS

TECHNICAL FIELD

The present teachings relate to robotic manipulators in general and, more particularly, to such manipulators constructed to control the movement of an end effector with combined serial and parallel links as to impart high stiffness, speed, and precision and to support heavy loads.

BACKGROUND

Objective. A tool must be positioned at the correct place and angle to work on an object. To cut a piece of wood, for example, a saw must be placed in contact with the wood at a desired location and angle. Novel mechanisms manipulate a tool at desired position coordinates and orientation angles in three-dimensional (3D) space. Alternatively, the mechanisms may determine the 3D position and orientation of a tool.

Kinematic linkages. Kinematic linkages control the position of a manipulator's movable platform, or 'end effector', relative to its base. A 'kinematic linkage' is an assembly of rigid links connected by movable 'revolute' or 'prismatic' joints enabling relative rotary or linear motion, respectively. The relative positions of the links determine the angular or linear positions of 'passive' joints, whereas actuators directly control the angular or linear positions of 'active' joints. Joint axes can intersect or be collinear with each other. For example, a cylindrical joint is a revolute joint collinear with a prismatic joint. Two intersecting revolute joints form a 2-DOF (degree-of-freedom) universal joint. Three intersecting revolute joints form a 3-DOF (degree-of-freedom) wrist or spherical joint. The manipulator embodiments presented here are non-planar three-dimensional (3D) kinematic linkages.

'Positioners' vs. 'manipulators'. Here, 'manipulators' are kinematic linkages that manipulate the position and orientation of tools in three dimensional space. Like our hands and arms manipulating a knife and fork for example. 'Positioners' are a subset of manipulators that position a point in three dimensional space. Like a 3-axis milling machine positioning the end of a cutting tool for example.

Serial manipulators. The kinematic linkages of 'serial manipulators' connect from the base to the movable platform in an open sequential chain. Serial manipulators typically have an overall large range of motion or 'workspace' since the workspaces of the kinematic linkages accumulate from the base to the movable platform. However, stiffness and precision of serial manipulators degrade cumulatively from the base to the movable platform. Compliance is the inverse of stiffness. The overall compliance of a serial connection is the sum of the compliances of the individual links and joints in the kinematic chain. Therefore, the overall compliance increases with the number of links and joints connected in series and so the overall stiffness decreases. The Cartesian positioner is a common serial manipulator, consisting of three active prismatic P joints (PPP) connected end-to-end and perpendicular to each other providing 3-DOF XYZ positioning control of an end effector. In joint notation '(PPP)' parentheses enclose individual serial kinematic linkages and underlines P denote active actuated joints. Cylindrical (PRP), SCARA [1] (RRP), and 3-DOF articulated [2] (RRR) serial positioners also provide 3-DOF positioning control with actuated prismatic P and revolute R joints. Industrial articulated robot arms, with six actuated revolute R joints (RRRRRR), are also serial manipulators. They typically have a vertical axis revolute joint attached to a fixed base, followed by two horizontal axes revolute joints, for 3-DOF linear translation position control. Adding a 3-axes spherical wrist (RRR), consisting of three intersecting revolute joints, could add 3-DOF angular rotation control with easily solved inverse kinematics [2]. In general, adding a 1-axes, 2-axes or 3-axes wrist, in series with a linear positioning manipulator, is a common way of adding rotation control to extend a manipulator's number of degrees-of-freedom. By contrast, differential motions of coupled-positioners rotating the movable tool platform of the manipulator embodiments are disclosed here.

Parallel manipulators. Multiple independent kinematic linkages connect the movable platform of a 'parallel manipulator' [3, 4, 5] to its base, in a closed-loop. The kinematic chains of most parallel manipulators connect at three or six locations at the moveable tool platform. By contrast, the kinematic chains of the manipulator embodiments disclosed here connect to the moveable platform at two or four locations. Parallel manipulators typically have higher stiffness, speed and precision compared to serial manipulators. The overall stiffness of parallel connected kinematic chains is the sum of the stiffness of the individual kinematic chains. Therefore, the overall stiffness increases with the number of parallel connected kinematic chains. However, parallel connected manipulators typically have limited range, i.e. smaller workspace, compared to serial ones. The overall workspace of parallel manipulators is limited to the workspaces of the individual kinematic linkages.

The hexapod is a parallel manipulator, first introduced by Gough and later published by Stewart. The 6-6 Gough-Stewart hexapod platform consists of six actuated prismatic P joints connected separately between a fixed base and a tool platform with universal U and spherical S joints at each end and with joint notation 6-(UPS). The notation '6-(·)' indicates that 6 serial kinematic linkages (·) connect in parallel. Non-underlined joints U, S are passive. Parallel connected manipulators have only one active joint per kinematic chain. The Delta robot, disclosed by Clavel is another parallel manipulator typically used for rapid, lightweight pick-and-place applications. It consists of three parallelograms made up of four spherical joints (SSSS) attached to the moving platform and actuated at the base by a link with revolute joints at each end 3-(RRSSSS). By replacing the RR sub-chain with an active prismatic joint P, Xiao and Torgny obtained a 3-(PSSSS) variant of the Delta robot that realized three-dimensional movement with linear actuators. A set of links connected to three linear carriages support the moving platform. Actuators adjust the positions of the carriages along three rails that determine the three-dimensional linear position of the platform. Wenger disclosed the 'orthoglide' that has three parallel connected identical kinematic chains 3-(PRPaR), where Pa stands for a parallelogram joint. Three mutually perpendicular actuated prismatic P joints translate the platform along three mutually perpendicular axes. Liu and Gao disclosed various kinematic structures for 2, 3, 4, 5-DOF parallel manipulator designs.

Kong disclosed a Cartesian parallel robot, known as the 'tripteron'. Like conventional serial Cartesian gantry robots, the tripteron moves the linear position of a tool platform along three mutually perpendicular axes. The tripteron has the same simple kinematics as a gantry robot: i.e. the linear position of each actuator directly corresponds to the linear position, along the same axis, of the tool platform, and vice versa. Three separate two-link arms, with revolute joints at the ends of the links, connect the tool platform to the three mutually perpendicular prismatic joints in a 3-PRRR arrangement. Gosselin, Kong, and Seward extended the tripteron to 4-DOF, 5-DOF and 6-DOF manipulators known as 'quadrupteron', 'pentapteron' and 'hexapteron' respectively. Although the stiffness of the so called 'multipteron' family benefits from a parallel connection of kinematic chains, each chain is composed of serially connected links and joints which may compromise overall stiffness.

Hybrid serial-parallel manipulators, with combined serial and parallel links, may have a large range of motion (workspace) combined with high stiffness, speed, precision and may support heavy loads. For example, the 'X', 'Y' axes of 3-axes knee milling machines typically connect in series whereas the 'Z' axis connects in parallel. Many hybrid serial-parallel manipulators consist of a 1-axes, 2-axes or 3-axes angular wrist in series with a 3-axes linear positioning manipulator. For example, additional rotary actuators, around the 'A', 'B', 'C' axes, in series with the 'X', 'Y', 'Z' axes, extend CNC milling machines to 4-axes, 5-axes or 6-axes control. However, the additional rotary actuators may be bulky and expensive. Similarly, Carlo extended the 3-axes orthoglide to 5-axes by adding a 2-axes wrist. The 'tricept' industrial robot is an example of a hybrid serial-parallel manipulator consisting of a 3-axes linear parallel connected manipulator 3-(RRPRRR) in series with a 3-axes actuated spherical wrist (RRR).

Tanev and Zheng disclosed hybrid serial-parallel manipulators consisting of two parallel manipulators connected in series. Each individual parallel manipulator has 3-DOF and together, the serially connected parallel manipulators have 6-DOF. This is complementary to a manipulator embodiment disclosed here that is composed of two serial manipulators connected in parallel.

Stuart disclosed various configurations of a manipulator to effect movement of a support member (platform) in three-dimensional space. The manipulator configurations include first and second 3-DOF actuator systems, each of which connects to the support member at a respective attachment point through 3-DOF revolute joints. By contrast, one of the 3-DOF actuator systems of manipulator embodiments disclosed here connects to the support member through a 2-DOF revolute joint.

SUMMARY

The needs set forth herein as well as further and other needs and advantages are addressed by the present embodiments, which illustrate solutions and advantages described below.

The system of the present embodiment includes, but is not limited to the following embodiments.

An embodiment of the manipulator system has a positioner having a primary rail, a first coupling linkage, and a second coupling linkage. The first coupling linkage coupling said primary rail to a base and positioning primary rail and said second coupling linkage along a first plane. The manipulator system has another positioner having a secondary rail, a third coupling linkage, and a fourth coupling linkage. The third coupling linkage coupling said secondary rail to the base and positioning said secondary rail and said fourth coupling linkage along a second plane parallel to the first plane. Further, the manipulator system has a common link coupling to said primary and secondary rails via said second and fourth coupling linkages, the common link defining a longitudinal axis that intersects the first plane and the second plane. Each of said second and fourth coupling linkages includes a joint for linear motion along the respective rail and rotational motion around the respective rail, and a revolute joint for relative pivoting between the respective rail and said common link. A position and orientation of said common link relative to the base is adjustable by said joints and said revolute joints.

Another embodiment of the manipulator system has second and fourth coupling linkages. Each of said second and fourth coupling linkages includes a joint for linear motion along the common link. The position and orientation of said common link relative to the base is adjustable by said joints for linear motion along the common link.

Another embodiment of the manipulator system has a support fixed to the base and connected to said first and third coupling linkages.

Another embodiment of the manipulator system has a first coupling linkage where said first coupling linkage is adjustable to move said primary rail relative to the base.

Another embodiment of the manipulator system has a first coupling linkage where said first coupling linkage includes a joint that provides linear motion of said primary rail along said support.

Another embodiment of the manipulator system has a joint on said first coupling where said joint of said first coupling linkage provides rotational motion of said primary rail around an axis of said support.

Another embodiment of the manipulator system has a third coupling linkage where said third coupling linkage is adjustable to move said secondary rail relative to the base.

Another embodiment of the manipulator system has a third coupling linkage where said third coupling linkage includes a joint that provides linear motion of said secondary rail along said support.

Another embodiment of the manipulator system has a joint of said third coupling linkage where said joint of said third coupling linkage provides rotational motion of said secondary rail around an axis of said support.

Another embodiment of the manipulator system has a second support fixed to the base.

Another embodiment of the manipulator system has a second support where said second support is parallel to said support.

Another embodiment of the manipulator system has a positioner where said positioner has at least two primary rails, a first primary rail that is connected to the base via said first coupling linkage, and a second primary rail that is connected to said common link via said second coupling linkage. A joint couples the first and second primary rails together such that said second primary rail is movable along said first primary rail.

Another embodiment of the manipulator system has a positioner where said positioner includes at least two secondary rails, a first secondary rail that is connected to the base via said third coupling linkage, and a second secondary rail that is connected to said common link via said fourth coupling linkage. A joint couples the first and second secondary rails together such that said second secondary rail is movable along said first secondary rail.

Another embodiment of the manipulator system has a joint coupling the first and second primary rails where said joint coupling the first and second primary rails together is a prismatic joint that provides linear motion of said second primary rail along said first primary rail.

Another embodiment of the manipulator system has a joint coupling the first and second secondary rails, where said joint coupling the first and second secondary rails includes a prismatic joint that provides linear motion of said second secondary rail along said first secondary rail.

Another embodiment of the manipulator system has a joint coupling the first and second primary rails together where said joint coupling the first and second primary rails together includes a prismatic joint that provides linear motion of said second primary rail along said first primary rail. The joint coupling the first and second primary rails also has a revolute joint that provides rotational motion of said second primary rail around an axis of said revolute joint.

Another embodiment of the manipulator system has a joint where said joint further includes a second prismatic joint that said second primary rail is free to slide through. The position of said second prismatic joint is adjustable along said second primary rail.

Another embodiment of the manipulator system has a joint coupling the first and second secondary rails where said joint coupling the first and second secondary rails together includes a prismatic joint that provides linear motion of said second secondary rail along said first secondary rail. The joint coupling the first and second secondary rails also has a revolute joint that provides rotational motion of said second secondary rail around an axis of said revolute joint.

Another embodiment of the manipulator system has a joint where said joint further includes a second prismatic joint that said second secondary rail is free to slide through. The position of said second prismatic joint is adjustable along said second secondary rail.

Another embodiment of the manipulator system has a positioner that further includes a third primary rail that is connected to the base via a second support. A joint couples the third and second primary rails together such that said second primary rail is movable along said third primary rail and said first primary rail is parallel to said third primary rail.

Another embodiment of the manipulator system has a joint that couples the third primary rail and the second primary rail together where the joint that couples the third primary rail and the second primary rail together includes a revolute joint for pivoting motion between the third primary rail and the second primary rail.

Another embodiment of the manipulator system has another positioner where said another positioner further includes a third secondary rail that is connected to the base via a second support. Another joint couples the second and third secondary rails together such that said second secondary rail is movable along said third secondary rail and said first secondary rail is parallel to said third primary rail.

Another embodiment of the manipulator system has a first primary rail and a second primary rail where said first primary rail and said first secondary rail are parallel, and said second primary rail and said second secondary rail are parallel.

Another embodiment of the manipulator system has a primary rail and a secondary rail where the primary rail and secondary rail are parallel.

Another embodiment of the manipulator system has a tool mounted to said common link.

An embodiment of a manipulator system has a positioner that includes a first primary rail, a second primary rail, a first coupling linkage, a second coupling linkage, and a third coupling linkage. The first coupling linkage couples said first primary rail to a base. The third coupling linkage connects the second primary rail to the first primary rail and positions said second primary rail and said second coupling linkage along a first plane. The embodiment of the manipulator system has another positioner that includes a first secondary rail, a second secondary rail, a fourth coupling linkage, a fifth coupling linkage, and a sixth coupling linkage. The fourth coupling linkage couples said first secondary rail to the base. The sixth coupling linkage couples the first secondary rail to the second secondary rail and positions said second secondary rail and said fourth coupling linkage along a second plane parallel to the first plane.

The embodiment further includes a common link coupled to said second primary rail and said second secondary rail via said second and fifth coupling linkages. The common link defines a longitudinal axis that intersects the first plane and the second plane. The third coupling linkage includes a prismatic joint for linear motion of the second primary rail along the first primary rail, and the sixth coupling linkage includes a prismatic joint for linear motion of the second secondary rail along the first secondary rail. The first coupling linkage has a prismatic joint for linear motion of the first primary rail along a support, and the fourth coupling linkage has a prismatic joint for linear motion of the first secondary rail along the support.

Each of said second and fifth coupling linkages includes a joint for linear motion along the respective rail and rotational motion around the respective rail, and a revolute joint for relative pivoting between the respective rail and said common link. The second primary rail and the second secondary rail are parallel. The revolute joint of the second coupling link has a revolute axis about which it rotates and the revolute joint of the fifth coupling linkage has a revolute axis about which it rotates. The revolute axis of the second coupling link is parallel to the revolute axis of the fifth coupling linkage. A position and orientation of said common link relative to the base is adjustable by said joints and said revolute joints.

An embodiment of parallel connected manipulator system has a primary manipulator system and a secondary manipulator system. The primary manipulator system is connected in parallel with said secondary manipulator system via a support. A coupling linkage of said primary manipulator system is connected to the support between two coupling linkages of said secondary manipulator system. One of the two coupling linkages of said secondary manipulator system connects to the support between the coupling linkage of said primary manipulator and another coupling linkage of said primary manipulator system. A common link of said primary manipulator system couples to a common link of said secondary manipulator system forming a connected common link, wherein a twist angle is allowable between said common link of said primary manipulator system and said common link of said secondary manipulator system. The support connects said primary manipulator system and said secondary manipulator system to a base wherein said base is movable along said support.

BRIEF DESCRIPTION OF THE DRAWINGS

FIGS. 6A-6D. Prior art, serial Cartesian positioner in series with a 3-axes actuated spherical wrist.

FIGS. 9A-9D. Hybrid serial-parallel 5-DOF coupled Cartesian manipulator with parallel joint axes, rotated −90° around axis $\hat{Z}_W$.

FIGS. 11A-11B. Parallel connected 5-DOF coupled Cartesian manipulator with movable base composed of the hybrid serial-parallel 5-DOF coupled Cartesian manipulators of FIGS. 8D, 9D.

DETAILED DESCRIPTION

Mathematical Description

Figure 10C:
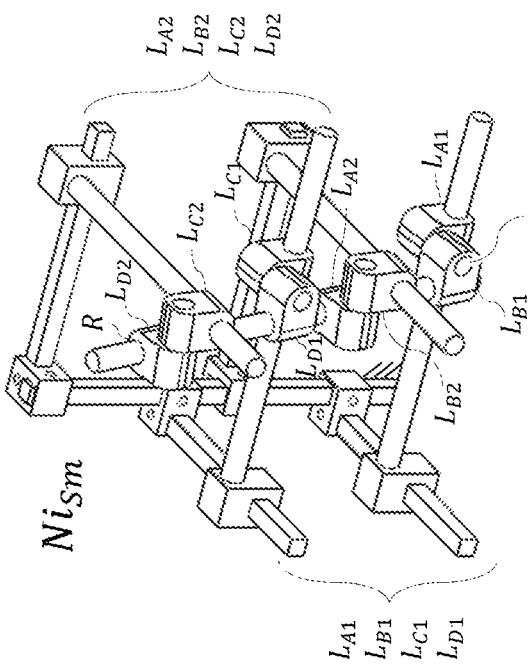
FIGS. 10A-10D. Parallel connected 4-DOF or 5-DOF coupled Cartesian manipulator composed of the hybrid serial-parallel 5-DOF coupled Cartesian manipulators of FIGS. 8C, 9C or FIGS. 8D, 9D.

Introduction. Equations, based on the coordinate frames of FIG. 12 and the nomenclature in Table 1, mathematically describe the coupled-positioners manipulator embodiments of FIGS. 2, 5, 7A-7D, 8A-8D, 9A-9D. The notation in FIG. 12 pertains to generic links $L_A$, $L_B$, $L_C$, $L_D$ but it applies equally to the specific links $L_{A1}$, $L_{B1}$, $L_{C1}$, $L_{D1}$ in FIG. 8A, 8B or links $L_{A2}$, $L_{B2}$, $L_{C2}$, $L_{B2}$ in FIG. 9A, 9B. The two manipulator embodiments from FIGS. 8C and 9C, or 8D and 9D, joined together by coaxial revolute joints along the tool-link (platform or common link), form the manipulator embodiments in FIGS. 10C, 11D. Therefore, the general mathematical descriptions derived for the manipulator embodiments in FIGS. 7A-7D, 8A-8D, 9A-9D also apply to the manipulator embodiments in FIGS. 10A-10D, 11A-11B. The mathematical equations provide bases for the design, simulation, control and analysis of the manipulator embodiments. They provide analytical expressions for the inverse kinematics and for the relative twist angle $\theta_{BD_Z}$ between links $L_B$, $L_D$.

TABLE 1

| Nomenclature. | |
|---|---|
| Symbol | Description |
| $L_T$ | Link T |
| $F_W$ | Coordinate frame W |
| $T^W = [x_T^W \ y_T^W \ z_T^W]'$ | Vector position of point T relative to frame $F_W$ |
| $x_T^W, y_T^W, z_T^W$ | Scalar coordinates of point T written in frame $F_W$ |
| $\hat{X}_T^W, \hat{Y}_T^W, \hat{Z}_T^W$ | Unit vectors of frame $F_T$ relative to $F_W$ |
| $\hat{X}_T^W = [x_{\hat{X}_T}^W \ y_{\hat{X}_T}^W \ z_{\hat{X}_T}^W]'$ | X axis unit vector of frame $F_T$ relative to frame $F_W$ |
| $x_{\hat{X}_T}^W, y_{\hat{X}_T}^W, z_{\hat{X}_T}^W$ | three scalar coordinates of unit vector $\hat{X}_T^W$ relative to frame $F_W$ |
| $R_T^W = [\hat{X}_T^W \ \hat{Y}_T^W \ \hat{Z}_T^W]$ | Rotation transformation matrix [3 × 3] of frame $F_T$ relative to $F_W$ |
| $R_T^W (\theta_{T_Z}, \theta_{T_X}, \theta_{T_Y})$ | Rotation matrix in terms of three sequential rotations |
| $\theta_{T_Z}$ | Scalar angular rotation around $\hat{Z}_T$ axis of frame $F_T$ |
| $\theta_{T_Z}, \theta_{T_X}, \theta_{T_Y}$ | Three sequential rotations around the $\hat{Z}_T, \hat{X}_T, \hat{Y}_T$ axes of frame $F_T$ |
| $\hat{Z}_T^W (\theta_{T_Z}, \theta_{T_X}, \theta_{T_Y})$ | Z axis unit vector in terms of three sequential rotation angles |

TABLE 1-continued

Nomenclature.

| Symbol | Description |
| --- | --- |
| [I] | Identity matrix [3 × 3] |
| ∥ | Parallel, i.e. equidistant lines |
| ∦ | Non-parallel, i.e. non-equidistant lines |
| P, R, U, S | Passive joints: prismatic, revolute, universal, spherical |
| <u>P</u>, <u>R</u>, <u>U</u>, <u>S</u> | Active joints: prismatic, revolute, universal, spherical |

Workspace. The orientations and positions of the components of the manipulator are expressed relative to a fixed workspace frame $F_W$.

Object. The manipulator interacts with an object in the workspace. Frame $F_O$ is fixed in the object. The object may be fixed in the workspace or it may be movable relative to the workspace by hand or by actuators.

Figure 12:
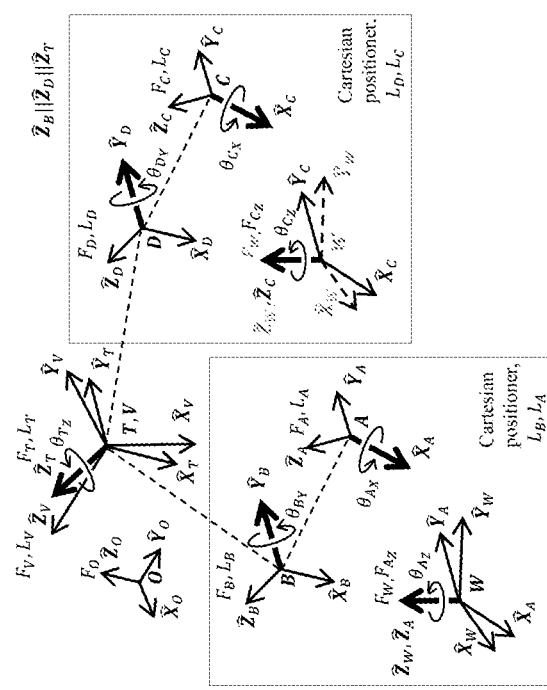
FIG. 12. Two-dimensional schematic of the coordinate frames, links and joints of the manipulator.

Coordinate frames. The positions and orientations of the components of the manipulator are expressed relative to Cartesian coordinate frames as shown in FIG. 12. For example, each link $L_A$ has frame $F_A$ that is fixed in the link. The origin $A^W$ of frame $F_A$ is coincident with the axis of the first revolute joint of link $L_A$. Link $L_B$ with frame $F_B$ connects to the second revolute joint of link $L_A$. Links $L_A$ and $L_B$ share this common revolute joint. The origin of the frame $F_B$ is at position $B^A$ relative to frame $F_A$ and is coincident with the axis of the common revolute joint.

Workspace orientation. The positive direction of unit vector $\hat{Z}_W$ of frame $F_W$ points vertically up In FIG. 12 according to typical mathematical conventions. However, the object to be worked on is beneath the manipulator for many practical applications like laser cutting, drilling or milling for example. In these cases, it is more practical for the positive direction of unit vector $\hat{Z}_W$ to point vertically down.

Link assembly. The manipulator has five links $L_A$, $L_B$, $L_C$, $L_D$, $L_T$ with embedded frames $F_A$, $F_B$, $F_C$, $F_D$, $F_T$ respectively. Links $L_A$, $L_B$, $L_C$, $L_D$ are grouped into two pairs $\{L_A, L_B\}$ and $\{L_C, L_D\}$. Links $L_A$, $L_C$ are the 'first' links of each pair and links $L_B$, $L_D$ are the 'second' links respectively.

Tool-link (platform or common link). The tool-link $L_T$ (platform or common link) is the interface of the manipulator to the tool that interacts with objects in the workspace. The tool-link $L_T$ connects links $L_B$, $L_D$ along a revolute or revolute-prismatic (cylindrical) joint parallel to axes $\hat{Z}_B^W$, $\hat{Z}_D^W$, $\hat{Z}_T^W$ so that the $\hat{Z}$ axes of frames $F_B$, $F_D$, $F_T$ are constrained to be parallel, i.e. $\hat{Z}_B^W \parallel \hat{Z}_D^W \parallel \hat{Z}_T^W$. The tool-link $L_T$ rigidly connects to either link $L_B$ or link $L_D$. If the tool-link $L_T$ connects to link $L_B$ then the two links form a single rigid body, so that they have the same orientation. Similarly, links $L_D$ and $L_T$ form a rigid body and have the same orientation if the tool-link $L_T$ rigidly connects to link $L_D$. For a preferred embodiment, described below, links $L_B$, $L_D$ both rigidly connect to tool-link $L_T$ forming a single rigid body.

First links. The first link $L_A$, $L_C$ of each pair $\{L_A, L_B\}$, $\{L_C, L_D\}$ rotates around joint axis $\hat{X}_A$, $\hat{X}_C$ located at position $A^W$w, $C^W$ fixed in link $L_A$, $L_C$ respectively. Two separate positioners independently translate linear positions $A^W$, $C^W$ of links $L_A$, $L_C$ in three-dimensions. Additionally, joint axes $\hat{X}_A$, $\hat{X}_C$ of links $L_A$, $L_C$ may rotate around the $\hat{Z}_W$ axis. Links $\{L_A, L_B\}$ form a link-pair with two rotational degrees-of-freedom and links $\{L_C, L_D\}$ form a separate link-pair with two rotational degrees-of-freedom.

Second links. The second link $L_B$, $L_D$ of each pair $\{L_A, L_B\}$, $\{L_C, L_D\}$ connects to the tool-link $L_T$ through a revolute-prismatic (cylindrical), revolute, prismatic or no joint, along axis $\hat{Z}_T$, that is located at fixed position $T^B$, $T^D$ relative to frame $F_B$, $F_D$ respectively. Depending on the embodiment, the prismatic joint may be necessary to accommodate changes in the distance between links $L_B$, $L_D$ as the tool-link orientation changes. The second link $L_B$ of pair $\{L_A, L_B\}$ connects to first link $L_A$ through a revolute joint located at fixed position $B^A$ relative to frame $F_A$ with angular rotation axis $\hat{Y}_B$ perpendicular to axis $\hat{Z}_T$. Similarly, the second link $L_D$ of pair $\{L_C, L_D\}$ connects through a revolute joint located at fixed position $D^C$ relative to frame $F_C$ with angular rotation axis $\hat{Y}_D$ perpendicular to axis $\hat{Z}_T$.

Tool-link orientation unit vector $\hat{Z}_T^W$ coordinates. The orientation of the $\hat{Z}_T$ axis of the tool-link frame $L_T$ is denoted by the unit vector $\hat{Z}_T^W = [x_{\hat{Z}_T}^W \, y_{\hat{Z}_T}^W \, z_{\hat{Z}_T}^W]'$ where $x_{\hat{Z}_T}^W$, $y_{\hat{Z}_T}^W$, $z_{\hat{Z}_T}^W$ are the three coordinates of $\hat{Z}_T^W$ relative to workspace frame $F_W$. Since the $\hat{Z}$ axes of links $L_B$, $L_D$, $L_T$ are parallel, their coordinates relative to frame $F_W$ are identical. Therefore $\hat{Z}_B^W = \hat{Z}_D^W = \hat{Z}_T^W$.

Tool-link rotation matrix $R_T^W$ is composed of the three unit vectors of frame $F_T$ written relative to workspace frame $F_W$: $R_T^W = [\hat{X}_T^W \, \hat{Y}_T^W \, \hat{Z}_T^W]$. The nine elements of the rotation matrix $$R_T^W = \begin{bmatrix} x_{\hat{X}_T}^W & x_{\hat{Y}_T}^W & x_{\hat{Z}_T}^W \\ y_{\hat{X}_T}^W & y_{\hat{Y}_T}^W & y_{\hat{Z}_T}^W \\ z_{\hat{X}_T}^W & z_{\hat{Y}_T}^W & z_{\hat{Z}_T}^W \end{bmatrix} \tag{2}$$

are the 'direction cosines' between the unit vectors of the two frames.

Tool-link rotation matrix for multiple axes rotation angle sequences. Rotation matrices for Tait-Bryan or Euler rotation angle sequences are available in the references disclosed herein. For example, the rotation matrix $R_T^W(\theta_{T_Z}, \theta_{T_X}, \theta_{T_Y})$ for the Z-X-Y intrinsic Tait-Bryan rotation sequence $\{\theta_{T_Z} \to \theta_{T_X} \theta_{T_Y}\}$ is, $$R_T^W(\theta_{T_Z}, \theta_{T_X}, \theta_{T_Y}) = \tag{3}$$

$$\begin{bmatrix} c(\theta_{T_Z})c(\theta_{T_Y}) - s(\theta_{T_Z})s(\theta_{T_X})s(\theta_{T_Y}) & -s(\theta_{T_Z})c(\theta_{T_X}) & s(\theta_{T_Z})s(\theta_{T_X})c(\theta_{T_Y}) + c(\theta_{T_Z})s(\theta_{T_Y}) \\ s(\theta_{T_Z})c(\theta_{T_Y}) + c(\theta_{T_Z})s(\theta_{T_X})s(\theta_{T_Y}) & c(\theta_{T_Z})c(\theta_{T_X}) & -c(\theta_{T_Z})s(\theta_{T_X})c(\theta_{T_Y}) + s(\theta_{T_Z})s(\theta_{T_Y}) \\ -c(\theta_{T_X})s(\theta_{T_Y}) & s(\theta_{T_X}) & c(\theta_{T_X})c(\theta_{T_Y}) \end{bmatrix}$$

where compact notation s(·), c(·) is used to represent sin(·), cos(·), respectively.

Tool-link unit vector angular representation $\hat{Z}_T^W(\theta_{T_Z}, \theta_{T_X}, \theta_{T_Y})$. Equating the third columns of Eqs. (2, 3) expresses the tool-link orientation unit vector in terms of three sequential rotation angles, $$\hat{Z}_T^W(\theta_{T_Z}, \theta_{T_X}, \theta_{T_Y}) = \begin{bmatrix} x_{\hat{Z}_T}^W \\ y_{\hat{Z}_T}^W \\ z_{\hat{Z}_T}^W \end{bmatrix} = \begin{bmatrix} s(\theta_{T_Z})s(\theta_{T_X})c(\theta_{T_Y}) + c(\theta_{T_Z})s(\theta_{T_Y}) \\ -c(\theta_{T_Z})s(\theta_{T_X})c(\theta_{T_Y}) + s(\theta_{T_Z})s(\theta_{T_Y}) \\ c(\theta_{T_X})c(\theta_{T_Y}) \end{bmatrix} \quad (4)$$

Tool-link orientation unit vector $\hat{Z}_T^W$ angles. The tool-link $L_T$ rigidly connects to either link $L_B$ or link $L_D$. The tool-link $L_T$ orientation vector $\hat{Z}_T^W$ matches the orientation of the link to which it connects. Therefore, tool-link $L_T$ orientation matches link $L_B$ orientation $\hat{Z}_T^W(\theta_{T_W}, \theta_{T_X}, \theta_{T_Y}) = \hat{Z}_B^W(\theta_{A_Z}, \theta_{A_X}, \theta_{B_Y})$ if the tool-link connects to link $L_B$ so that they have the same orientation angles $\theta_{T_Z} = \theta_{A_Z}$, $\theta_{T_X} = \theta_{A_X}$, $\theta_{T_Y}$. Substituting $\{\theta_{A_Z}, \theta_{A_X}, \theta_{B_X}\} = \{\theta_{T_Z}, \theta_X, \theta_{T_Y}\}$ into Eq. (4) expresses the unit vector $\hat{Z}_T^W$ in terms of the three sequential rotation angles $\theta_{A_Z}, \theta_{A_X}, \theta_{B_Y}$ $$\hat{Z}_T^W(\theta_{A_Z}, \theta_{A_X}, \theta_{B_Y}) = \begin{bmatrix} x_{\hat{Z}_T}^W \\ y_{\hat{Z}_T}^W \\ z_{\hat{Z}_T}^W \end{bmatrix} = \quad (5)$$

$$\begin{bmatrix} s(\theta_{A_Z})s(\theta_{A_X})c(\theta_{B_Y}) + c(\theta_{A_Z})s(\theta_{B_Y}) \\ -c(\theta_{A_Z})s(\theta_{A_X})c(\theta_{B_Y}) + s(\theta_{A_Z})s(\theta_{B_Y}) \\ c(\theta_{A_X})c(\theta_{B_Y}) \end{bmatrix}$$

If the tool-link $L_T$ connects to link $L_B$ then the orientation angles $\theta_{A_X}, \theta_{B_Y}$ of links $L_A, L_B$ in terms of the coordinates $\hat{Z}_T^W = [x_{\hat{Z}_T}^W \ y_{\hat{Z}_T}^W \ z_{\hat{Z}_T}^W]'$ of the tool-link axis depend on orientation angle $\theta_{A_Z}$ of link $L_A$ and are derived from Eq. (5), $$\theta_{A_X} = a\tan 2(\sin(\theta_{A_Z})x_{\hat{Z}_T}^W - \cos(\theta_{A_Z})y_{\hat{Z}_T}^W, z_{\hat{Z}_T}^W),$$
$$0 \leq \theta_{A_X} \leq 2\pi \quad (6)$$

$$\theta_{B_Y} = \sin^{-1}(\cos(\theta_{A_Z})x_{\hat{Z}_T}^W + \sin(\theta_{A_Z})y_{\hat{Z}_T}^W), -\pi/2 \leq \theta_{B_Y} \leq \pi/2 \quad (7)$$

where, $\theta = a\tan 2(y,x)$ is the four quadrant arctan(y/x) function with range $0 \leq \theta \leq 2\pi$ and the range of $\theta = \sin^{-1}(\cdot)$ is $-\pi/2 \leq \theta \leq \pi/2$.

Similarly, if tool-link $L_T$ connects to link $L_D$ then the orientation angles $\theta_{C_X}, \theta_{D_Y}$ of links $L_C, L_D$ depend on orientation angle $\theta_{C_Z}$ of link $L_C$, $$\theta_{C_X} = a\tan 2(\sin(\theta_{C_Z})x_{\hat{Z}_T}^W - \cos(\theta_{C_Z})y_{\hat{Z}_T}^W, z_{\hat{Z}_T}^W),$$
$$0 \leq \theta_{C_X} \leq 2\pi \quad (8)$$

$$\theta_{D_Y} = \sin^{-1}(\cos(\theta_{C_Z})x_{\hat{Z}_T}^W + \sin(\theta_{C_Z})y_{\hat{Z}_T}^W), -\pi/2 \leq \theta_{D_Y} \leq \pi/2 \quad (9)$$

Relative twist angle $\theta_{BD_Z}$ between links $L_B, L_D$. In general, links $L_B, L_D, L_T$ rotate relative to each other by relative twist angle $\theta_{BD_Z}$ around their common $\hat{Z}_B^W, \hat{Z}_D^W, \hat{Z}_T^W$ axis. The rotation matrix $R_B^D$ expresses the orientation of link $L_B$ relative to link $L_D$. Rotation matrix $R_B^D$ may be expressed in terms of the rotation matrices $R_D^W, R_B^W$ as follows. From $R_B^D = R_W^D R_B^W$ and the inverse property of orthogonal rotation matrices $R_W^D = [R_D^W]^{-1} = [R_D^W]'$ yields, $$R_B^D = [R_D^W]' R_B^W \quad (10)$$

where $R_B^W(\theta_{A_Z}, \theta_{A_X}, \theta_{B_Y})$ and $R_D^W(\theta_{C_Z}, \theta_{C_X}, \theta_{D_Y})$ may be expressed in terms of Z-X-Y intrinsic Tait-Bryan rotation angles from Eq. (3) with appropriate variable substitutions $\{\theta_{A_Z}, \theta_{A_X}, \theta_{B_Y}\} = \{\theta_{T_Z}, \theta_{T_X}, \theta_{T_Y}\}$ and $\{\theta_{C_Z}, \theta_{C_X}, \theta_{D_Y}\} = \{\theta_{T_Z}, \theta_{T_X}, \theta_{T_Y}\}$ respectively. The nine components of rotation matrix $R_B^D$ may be computed numerically from Eq. (10).

The orientation of link $L_B$ relative to link $L_D$ may also be expressed in terms of the relative twist angle $\theta_{BD_Z}$ around the common $\hat{Z}_B^W, \hat{Z}_D^W$ axis with corresponding rotation matrix $R_{B_Z}^{D_Z}(\theta_{BD_Z})$ [21], $$R_{B_Z}^{D_Z}(\theta_{BD_Z}) = \begin{bmatrix} \cos(\theta_{BD_Z}) & -\sin(\theta_{BD_Z}) & 0 \\ \sin(\theta_{BD_Z}) & \cos(\theta_{BD_Z}) & 0 \\ 0 & 0 & 1 \end{bmatrix} \quad (11)$$

equating Eqs. (10, 11), $$R_{B_Z}^{D_Z}(\theta_{BD_Z}) = R_B^D = [R_D^W]' R_B^W \quad (12)$$

and dividing the [1,2] and [2,2] components of rotation matrices $$R_{B_Z}^{D_Z},$$

and $R_B^D$ yields the relative twist angle, $$\theta_{BD_Z} = a\tan 2(R_B^D[1,2], R_B^D[2,2]) \quad (13)$$

where $R_B^D[1,2]$, $R_B^D[2,2]$ are the [1,2] and [2,2] components of rotation matrix $R_B^D$.

Accommodating relative twist angle $\theta_{BD_Z}$. In general, the three links $L_B, L_D, L_T$ must be connected by a revolute joint because of the relative twist angle $\theta_{BD_Z}$ between the links, around their common $\hat{Z}_T$ axis. However, if the relative angle $\theta_{A_Z} - \theta_{C_Z}$ between links $L_B, L_D$ is fixed, then the absolute value of the relative twist angle $\theta_{BD_Z}$ typically varies by less than a few degrees, depending on the orientation of the tool-link. Therefore, the revolute joint connecting links $L_B, L_D, L_T$ may be implemented with mechanical components with only limited range of angular motion if the relative angle $\theta_{A_Z}, \theta_{C_Z}$ between links $L_B, L_D$ is fixed. For example, the mechanical components along the tool-link of the interleaved coupled Cartesian manipulator $\ln_{Sm}$, with intersecting revolute joint axes, in FIG. 11B do not run into each other because $\theta_{BD_Z} < \pm 16°$ over the full $\theta_p \leq \pm 45°$ polar angular range of orientation of the tool-link.

No relative twist angle $\theta_{BD_Z} = 0$. There is no relative twist angle $\theta_{BD_Z} = 0$ between links $L_B, L_D$ if the rotation angles $\theta_{A_Z} = \theta_{C_Z}$ of links $L_A, L_C$ are equal. Setting $\theta_{A_Z} = \theta_{C_Z}$ in Eqs. (6, 8) shows that $\theta_{A_X} = \theta_{C_X}$. Similarly, setting $\theta_{A_Z} = \theta_{C_Z}$ in Eqs. (7, 9) shows that $\theta_{B_Y} = \theta_{D_Y}$. Since all three pairs of corresponding rotation angles are equal $\{\theta_{A_Z}, \theta_{A_X}, \theta_{B_Y}\} = \{\theta_{C_Z}, \theta_{C_X}, \theta_{D_Y}\}$ the corresponding rotation matrices $R_B^W(\theta_{A_Z}, \theta_{A_X}, \theta_{B_Y}) = R_D^W(\theta_{C_Z}, \theta_{C_X}, \theta_{D_Y})$ are also equal so that $R_B^D = [R_D^W]' R_B^W = [I]$ in Eq. (10). Substituting in the [1,2] and [2,2] components of $R_B^D = [I]$ into Eq. (13) shows that the relative twist angle $\theta_{BD_Z} = a\tan 2(0,1) = 0$, if $\theta_{A_Z} = \theta_{C_Z}$.

Singularities. Theoretically, the coupled Cartesian manipulator has singularities at tool-link orientation angles $\theta_{T_X}=\pm 90°$, $+\theta_{T_Y}=\pm 90°$ however the mechanical hardware of the manipulator prevents those angles from being reached in practice.

Inverse kinematics for manipulator embodiments with intersecting joint axes. The inverse kinematics for manipulator embodiments with intersecting joint axes are very simple since the origins $A^W$, $C^W$ of their links $L_A$, $L_C$ lie on the $\hat{Z}_T^W$ axis of the tool-link $L_T$. Given desired position $T^W$ and orientation $\hat{Z}_T^W$ of the tool-link $L_T$, the inverse kinematic positions of links $L_A$, $L_C$ are, $$A^W = z_A^T \hat{Z}_T^W + T^W \qquad (14)$$

$$C^W = z_C^T \hat{Z}_T^W + T^W \qquad (15)$$

where $z_A^T$, $z_C^T$ are the position coordinates, along the tool-link $\hat{Z}_T^W$ axis, of links $L_A$, $L_C$ relative to the origin $T^W$ of the tool-link frame $F_T$.

Description of Embodiments

Hybrid serial-parallel coupled-positioners manipulator with parallel joint axes. The 'parallel-revolute-axes' configuration where revolute axes $\hat{X}_A^W$, $\hat{X}_C^W$ are parallel so that $\hat{X}_A^W \| \hat{X}_C^W$ and angles $\theta_{A_Z}=\theta_{C_Z}$, is a preferred embodiment of the manipulator. There is no relative twist angle $\theta_{BD_Z}=0$ between links $L_B$, $L_D$ around their common $\hat{Z}_B=\hat{Z}_D$ axis for the parallel-revolute-axes embodiment. This means that links $L_B$, $L_D$ can connect to the tool-link without using a revolute joint between them. This simplifies the mechanical assembly of the manipulator and makes it inherently stiffer. It can also reduce the number of actuators required. If links $L_B$, $L_D$ couple, without a revolute joint, then angle $\theta_{A1_Z}$ is forced to be the same as angle $\theta_{C1_Z}$, i.e. $\theta_{A1_Z}=\theta_{C1_Z}$. This means that only one set of independent actuators is needed to actively control either $\theta_{A1_Z}$ or $\theta_{C1_Z}$ since the other angle is driven passively through the rigid angular connection between links $L_B$, $L_D$.

Hybrid serial-parallel coupled-positioners manipulator with parallel joint axes and fixed distance between links $L_B$, $L_D$. In addition to the parallel-revolute-axes constraint where $\theta_{A_Z}=\theta_{C_Z}$, a further preferred embodiment is implemented by constraining a fixed Euclidean distance $\|D-B\|_2$ between links $L_B$, $L_D$. Therefore, for the parallel-revolute-axes embodiment, links $L_B$, $L_D$, $L_T$ can be rigidly connected to each other for a further preferred embodiment of the manipulator. The three links form a single rigid body so that the distance $\delta z_T^{B-D}=|z_T^B-z_T^D|$ along the tool-link axis $\hat{Z}_T$ between links $L_B$, $L_D$ is fixed. In this case, the $z_A^W$ or $z_C^W$ coordinates of positions A or C of link $L_A$ or $L_C$ must be free to slide along the $\hat{Z}_W$ axis of the workspace to accommodate changes in distance as the tool-link orientation changes.

Over-constrained. The two preferred embodiments, of the two previous paragraphs, over-constrain the manipulator. This feature can be used to take out mechanical play from the linear and rotary bearings and to increase overall stiffness of the manipulator. However, this comes at the expense of potentially increased internal load and wear on the bearings resulting in shorter life. Precise relative alignment of the components is required for over-constrained manipulator embodiments.

Detailed Description of the Drawings

Items with identical label numbers, in all of the figures, identify identical items with identical functions. The figures illustrate topologies of coupled non-Cartesian FIGS. 1-5 and coupled Cartesian FIGS. 6-27 manipulator embodiments.

However non-Cartesian and Cartesian positioners may also be coupled together. Similarly, different types of non-Cartesian positioners, like cylindrical positioner and modified SCARA positioner, may also be coupled together.

Figure 1:
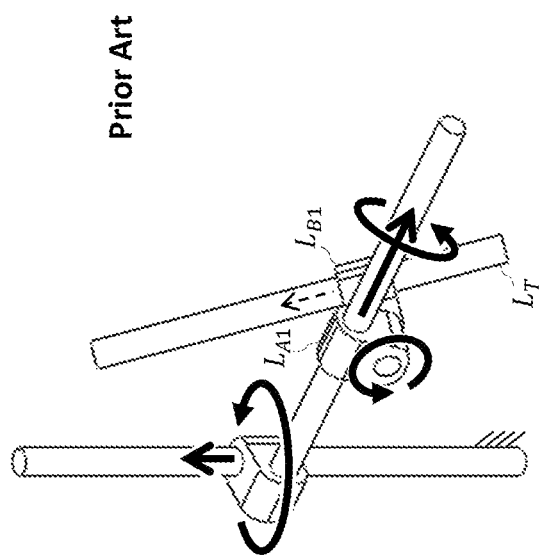
FIG. 1. Prior art, serial cylindrical positioner in series with a 2-axes actuated spherical wrist for overall 5-DOF control of a tool-link.

FIG. 1 depicts a serial cylindrical positioner (PRP) in series with a 2-axes actuated spherical wrist (RR) for overall 5-DOF control of the platform (common link or tool-link). Two links $L_{A1}$, $L_{B1}$ couple cylindrical positioner (PRP) to tool-link (platform or common link) $L_T$. The cylindrical positioner translates the position of the tool-link and two actuated revolute joints (RR) driving links $L_A$, $L_B$ to manipulate the orientation of the tool-link $L_T$ with 5-DOF control and overall joint notation (PRPRR). The manipulator in FIG. 1 controls the position and orientation of tool-link $L_T$ relative to a fixed base. Four diagonal hash marks identify the fixed base here and in the subsequent drawings. Heavy arrows depict actuated prismatic P and revolute R joints here and in the subsequent drawings. The dashed arrow depicts an alternate embodiment (RPRRP) of the manipulator, where the first prismatic joint of couple cylindrical position is fixed and the prismatic joint attached to the tool-link, depicted by the dashed straight arrow, is active.

Figure 2:
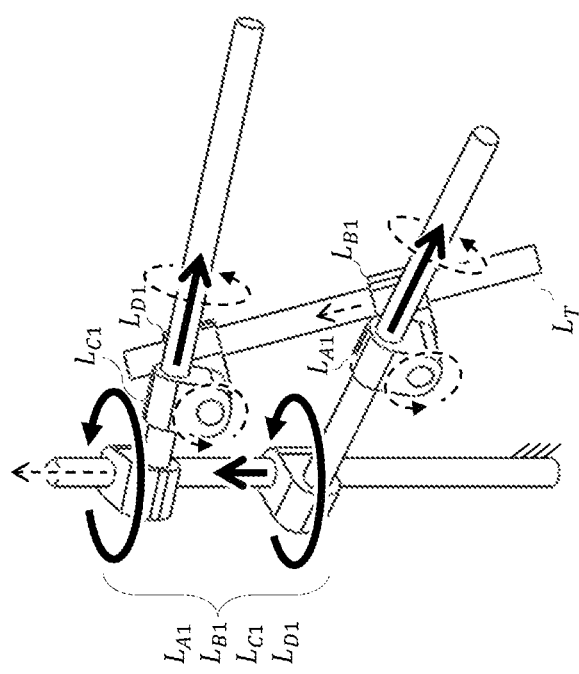
FIG. 2. Hybrid serial-parallel 5-DOF coupled cylindrical manipulator.

FIG. 2 depicts a hybrid serial-parallel 5-DOF (degree-of-freedom) coupled cylindrical manipulator. Coupling the cylindrical positioner from FIG. 1 to a second cylindrical positioner yields the hybrid serial-parallel 5-DOF coupled cylindrical manipulator (PRPRR) (PRPRR) of FIG. 2. Links $L_{A1}$, $L_{B1}$ couple the first cylindrical positioner to the tool-link (platform or common link) $L_T$ and links $L_{C1}$, $L_{D1}$ couple the second cylindrical positioner to the same tool-link $L_T$. The actuated revolute joints driving the joints of links $L_{A1}$, $L_{B1}$ in FIG. 1 are now replaced with passive revolute joints depicted by dashed elliptical arrows in FIG. 2. Similarly, links' $L_{C1}$, $L_{D1}$ revolute joints are passive. Tool-link orientation is manipulated by differential motion of the two cylindrical positioners.

Figure 3:
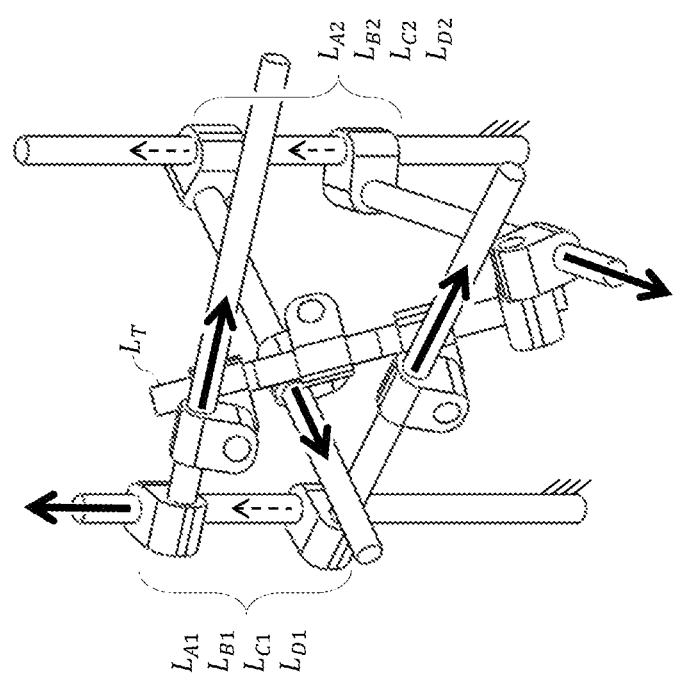
FIG. 3. Parallel connected, multi degrees-of-freedom, coupled cylindrical manipulator composed of the hybrid serial-parallel 5-DOF coupled cylindrical manipulators of FIG. 2.

FIG. 3 depicts a parallel connected coupled cylindrical manipulator with multiple degrees-of-freedom. Coupling, to a common tool-link $L_T$, the hybrid serial-parallel 5-DOF coupled cylindrical positioner from FIG. 2, with links $L_{A1}$, $L_{B1}$, $L_{C1}$, $L_{D1}$, to a second hybrid serial-parallel 5-DOF coupled cylindrical positioner, with links $L_{A2}$, $L_{C2}$, $L_{D2}$, yields the parallel connected 5-DOF coupled cylindrical manipulator (PRPRR)-(3-(PRPRR)) of FIG. 3 with 5 actuated prismatic joints depicted by heavy straight arrows. Fixing the active prismatic P joint attached to the fixed base produces a parallel connected 4-DOF coupled cylindrical manipulator embodiment with joint notation 4-(PRPRR).

Figure 4:
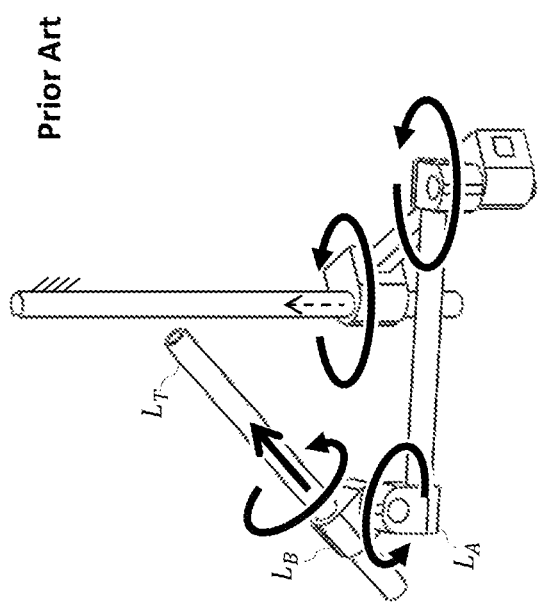
FIG. 4. Prior art, serial modified SCARA positioner in series with a 2-axes actuated spherical wrist for overall 5-DOF control of tool-link.

FIG. 4 depicts a serial modified 5-DOF SCARA positioner with joint notation (RRRRP). The dotted straight arrow depicts and alternate embodiment with joint notation (PRRRR) where the first prismatic joint, attached to the fixed base is active and the last prismatic joint, attached to the tool-link is fixed.

Figure 5:
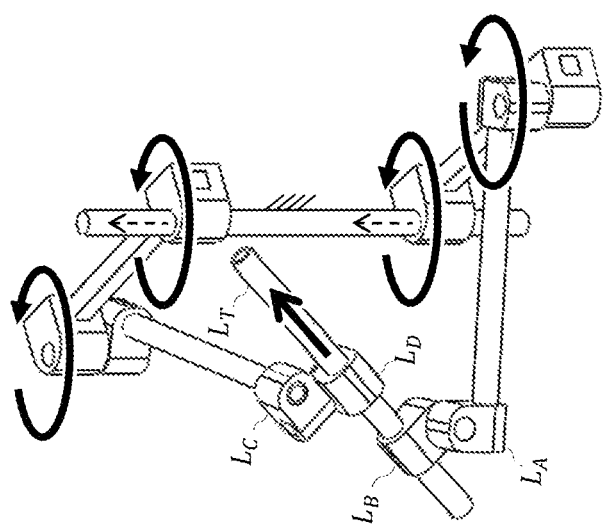
FIG. 5. Hybrid serial-parallel 5-DOF coupled modified SCARA manipulator.
Figure 7C:
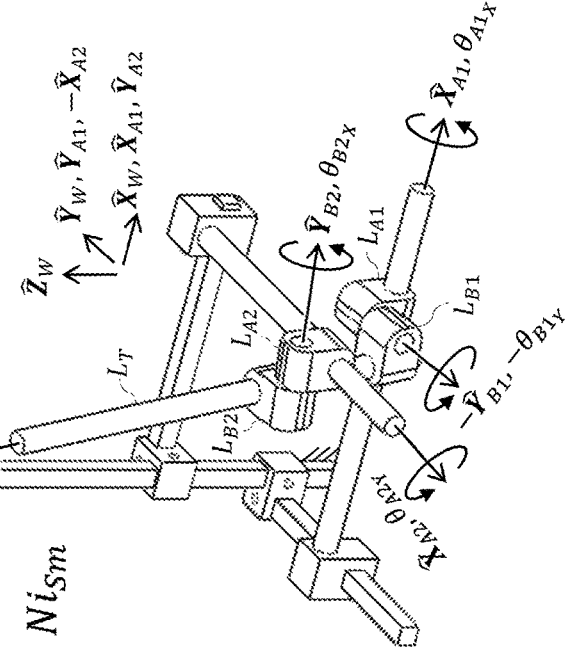
FIGS. 7A-7D. Hybrid serial-parallel 5-DOF coupled Cartesian manipulator with non-parallel joint axes.
Figure 7D:
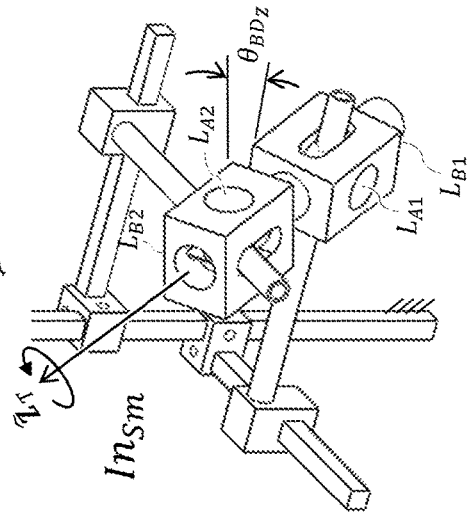
Figure 7A:
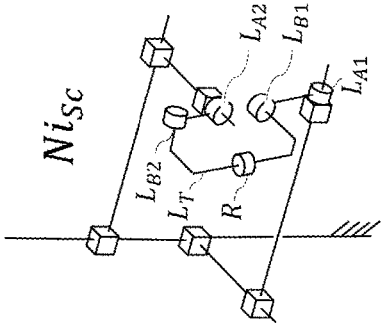
Figure 7B:
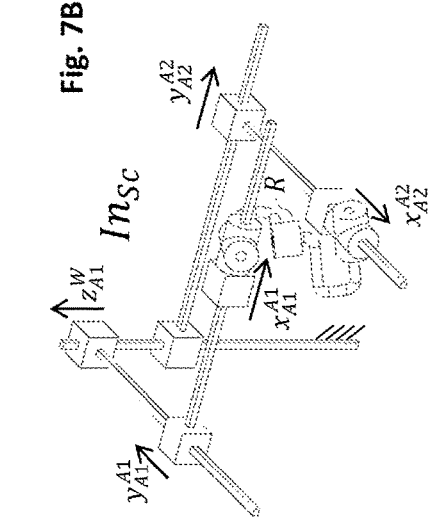

FIG. 5 depicts a hybrid serial-parallel 5-DOF coupled modified SCARA manipulator. Five active joints, depicted by heavy arrows, manipulate the position and orientation of the tool-link $L_T$ of the hybrid serial-parallel 5-DOF coupled modified SCARA positioner with joint notation (RRRRP)-(RRRRP).

FIGS. 6-11 illustrate the topology of coupled Cartesian manipulator embodiments. Since it is difficult to visualize their 3D topologies using only 2D drawings the manipulator embodiments are broken down into several sub-assemblies, where the various components are easier to see. Each individual sub-assembly functions as a stand-alone manipulator, with its own unique features, that are described in the text and summarized in Table 2. The sub-assemblies progress in sequence from serial to hybrid serial-parallel to parallel connected coupled manipulator embodiments. The individual sub-assemblies combine hierarchically to form the parallel connected 5-DOF coupled Cartesian manipulator embodiments depicted in FIGS. 11A, 11B, i.e. two prior art serial Cartesian positioners in FIGS. 6C, 6D form a single hybrid serial-parallel 5-DOF coupled Cartesian manipulator. See FIGS. 8C, 8D, 9C, 9D. Two hybrid serial-parallel 5-DOF coupled Cartesian manipulator embodiments form a single parallel connected 5-DOF coupled Cartesian manipulator in FIGS. 11A, 11B.

Each one of the FIGS. 6-10 has four drawings. The first row of drawings $Ni_{Sc}$, $Ni_{Sm}$ depicts manipulator embodiments with non-intersecting revolute joint axes and the second row depicts manipulator embodiments $In_{Sc}$, $In_{Sm}$ with intersecting revolute joint axes. Linear actuators transmit axial forces directly to the tool-link through the intersecting revolute joint axes without imparting lateral or moment loads. Furthermore, linear actuators directly control, through the intersecting axes, the positions of points on the tool-link for precise control of the tool-link. The manipulator embodiments $In_{Sc}$, $In_{Sm}$ with intersecting joint axes are more compact, however it is easier to visualize the individual movable links $L_A$, $L_B$, $L_C$, $L_D$ of the manipulator embodiments $Ni_{Sc}$, $Ni_{Sm}$ with non-intersecting joint axes. The first column of drawings in FIGS. 6-10, for example, FIGS. 6A and 6B, depict schematics $Ni_{Sc}$, $In_{Sc}$, of the manipulator embodiments and the second column in FIGS. 6-10, for example, FIGS. 6C and 6D, depicts solid models $Ni_{Sm}$, $In_{Sm}$.

FIG. 11A depicts a schematic $In_{Sc}$ and FIG. 11B depicts solid model $In_{Sm}$ of parallel connected coupled Cartesian manipulator embodiments with intersecting joint axes that position tool-link $L_T$ relative to moving base $L_{Bs}$ with 5-DOF. The solid model $In_{Sm}$ in FIG. 11B is based on commercially available hardware for motors, bearings, ball screw actuators and structural components.

Serial Cartesian manipulator. The prior art manipulator in FIGS. 6A-6D adjusts the position and orientation of tool-link $L_T$ relative to the fixed vertical base link $L_W$. Only one of four possible vertical base links $L_W$ is shown, to make the movable links $L_{A1}$, $L_{B1}$, $L_T$ easier to see. Three serial prismatic joints, acting along the $\hat{X}_{A1}$, $\hat{Y}_{A1}$, $\hat{Z}_{A1}$ axes, in series with three serial revolute joints, acting around the $\hat{X}_{A1}$, $\hat{Y}_{B1}$, $\hat{Z}_{B1}$ axes, comprise the (PPPRRR) serial manipulator of FIGS. 6C, 6D. Parentheses enclose the joints of the serial kinematic linkage. Underlined joint notation P, R denotes active (actuated) prismatic and revolute joints respectively. The three active prismatic P joints translate the three-dimensional linear position of link $L_{A1}$. Two active revolute R joints, rotating around the $\hat{X}_{A1}$, $\hat{Y}_{B1}$ axes, adjust the angular orientation of link $L_{B1}$. A third active revolute R joint twists tool-link $L_T$ around its longitudinal $\hat{Z}_T$ axis. Tool-link $L_T$ axis $\underline{Z}_T$ is coaxial with link $L_B$ axis $\hat{Z}_B$. The three active prismatic P and three active revolute R joints are independently actuated for 6-DOF control of the tool-link $L_T$. The five short arrows in schematic $In_{Sc}$, identify the active joints. Solid model drawings $Ni_{Sm}$, $In_{Sm}$ identify the coordinate frame of the manipulator embodiments' links. Rotation axes $\hat{X}_{A1}$, $\hat{Y}_{B1}$ of manipulator embodiments $Ni_{Sc}$, $Ni_{Sm}$ do not intersect. Consequently links $L_A$, $L_B$ are easier to see compared to the intersecting revolute joint axes manipulator embodiments $In_{Sc}$, $In_{Sm}$. However, link $L_B$ of the solid model $In_{Sm}$ is transparent so that link $L_A$ is visible in the drawing. The topology of the manipulator in FIGS. 6C, 6D is comparable to some common 5-axes CNC milling machines with their spindles aligned with the $\hat{Z}_T$ axis.

Hybrid serial-parallel coupled Cartesian manipulator with non-parallel joint axes. A common tool-link $L_T$ connects, in parallel, two serial manipulators from FIGS. 6C, 6D, forming the hybrid serial-parallel 5-DOF coupled Cartesian manipulator(PPPRRR) (PPPRR) of FIG. 7C, 7D. Parentheses enclose individual serial kinematic linkages. The hyphen '-' indicates that the two serial kinematic linkages connect in parallel. Non-underlined P and R represent passive prismatic and revolute joints respectively. Five linear actuators, acting along the $\hat{X}_{A1}$, $\hat{Y}_{A1}$, $\hat{Z}_{A1}$, $\hat{X}_{C1}$, $\hat{Y}_{C1}$, axes manipulate tool-link $L_T$ with 5-DOF. Short arrows in schematic $In_{Sc}$, identify the five active joints. The first active prismatic P joint of the first serial manipulator (PPPRRR) controls the tool-link in the $\hat{Z}_W$ direction. The same first passive prismatic P joint of the second serial manipulator (PPPRR) accommodates changes in distance, between the links, as the tool-link orientation changes. The actuated revolute joints around the $\hat{X}_{A1}$, $\hat{Y}_{B1}$ axes from FIGS. 6C, 6D are now passive as are the revolute joints around the $\hat{X}_{C1}$, $\hat{Y}_{D1}$ axes. Now linear actuators solely manipulate the orientation of the $\hat{Z}_T$ axis of tool-link $L_T$ instead of the rotary actuators in FIGS. 6C, 6D. The two sets of revolute joint axes $\hat{X}_{A1} \nparallel \hat{X}_{A2}$ and $\hat{Y}_{B1} \nparallel \hat{Y}_{B2}$ are not parallel in FIGS. 7C, 7D. Consequently, as proven below, links $L_{B1}$ and $L_{B2}$ twist relative to each other around the tool-link $\hat{Z}_T$ axis, as the orientation of tool-link $L_T$ changes. Therefore, a passive revolute R joint, around the tool-link $\hat{Z}_T$ axis, is necessary to accommodate the relative twist angle $\theta_{BD_Z}$, shown in FIG. 7D. Again, links $L_{B1}$, $L_{B2}$, are transparent in the solid model $In_{Sm}$, so that links $L_{A1}$, $L_{A2}$ are visible respectively.

Figure 8C:
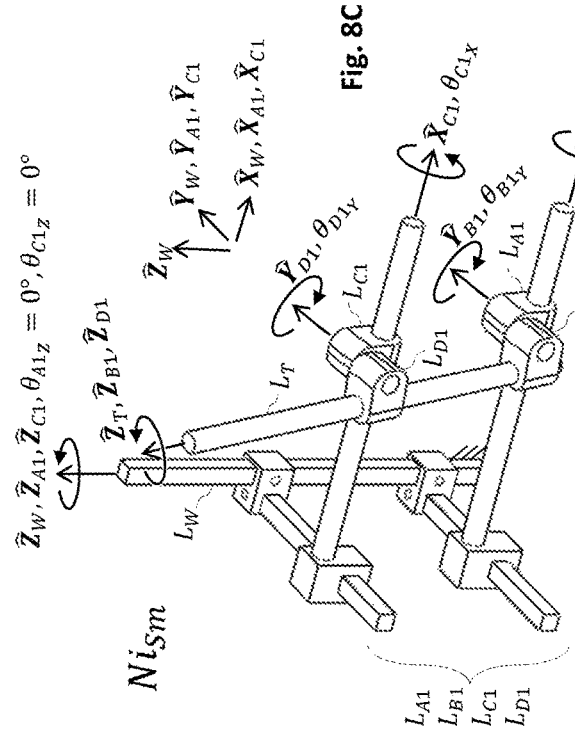
FIGS. 8A-8D. Hybrid serial-parallel 5-DOF coupled Cartesian manipulator with parallel joint axes, rotated 0° around axis $\hat{Z}_W$.
Figure 8D:
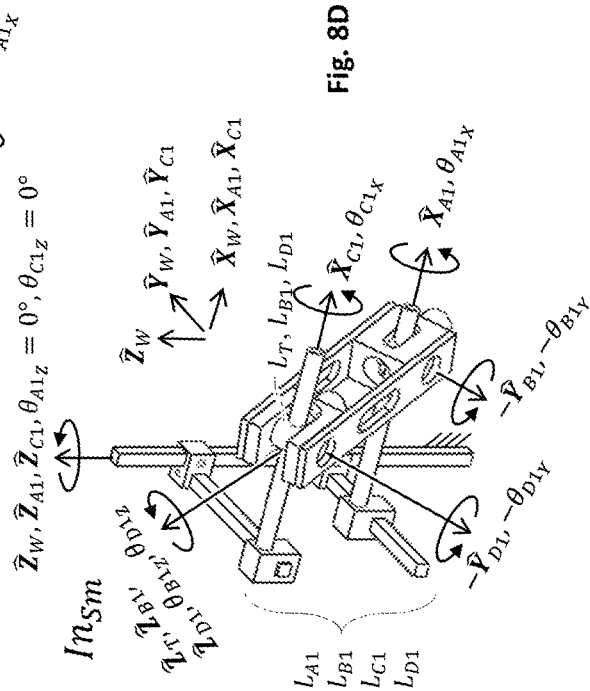
Figure 8A:
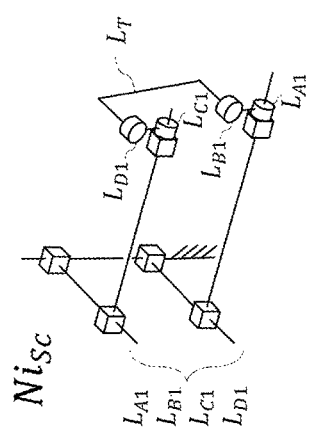
Figure 8B:
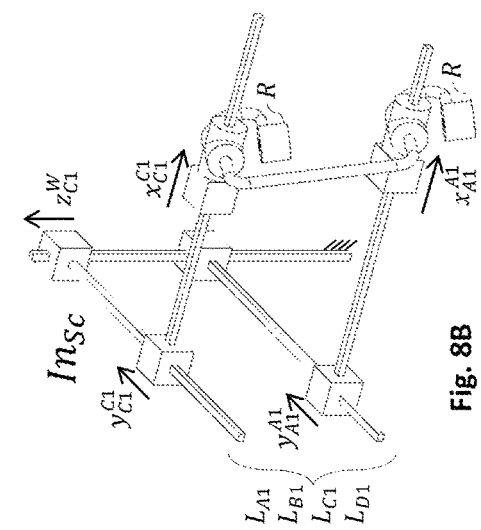

Hybrid serial-parallel coupled Cartesian manipulator with parallel joint axes. The two sets of revolute joint axes $\hat{X}_{A1} \| \hat{X}_{C1}$ and $\hat{Y}_{B1} \| \hat{Y}_{D1}$ are parallel in FIGS. 8C, 8D for all tool-link $L_T$ orientations. Since revolute joint axes $\hat{Y}_{B1} \| \hat{Y}_{D1}$ are parallel, there is no relative twist angle $\theta_{BD_Z}$ between links $L_{B1}$ and $L_{D1}$ so a passive revolute joint is not required between them and links $L_{B1}$, $L_{D1}$, $L_T$ connect, forming a single rigid body as shown in FIG. 8D drawing $In_{Sm}$. The hybrid serial-parallel 5-DOF coupled Cartesian manipulator with parallel joint axes of FIGS. 8C, 8D has joint notation (PPPRR)-(PPPRR).

The manipulator in FIGS. 9A-9D is identical to the one in FIGS. 8A-8D except that it is rotated −90° around the $\hat{Z}_W$ axis. The link and coordinate symbols in FIGS. 9A-9D are labeled with subscript '2' to distinguish them from the ones in FIGS. 8A-8D with subscript '1'.

Parallel connected 4-DOF coupled Cartesian manipulator. Common tool-link $L_T$ connects the two hybrid serial-parallel coupled Cartesian manipulator embodiments from FIGS. 8C, 9C, or FIGS. 8D, 9D. Together they form the parallel connected 4-DOF coupled Cartesian manipulator embodiments of FIGS. 10C, 10D. Passive revolute R joints along the tool-link $\hat{Z}_T$ axis accommodate relative twist angle $\theta_{BD_Z}$ between links $L_{B1}$, $L_{D1}$ and $L_{B2}$, $L_{D2}$ since the joint axes of the two manipulator embodiments from FIGS. 8C, 9C or FIGS. 8D, 9D are not parallel to each other. Two coaxial revolute R joints constrain the orientation of the tool-link $\hat{Z}_T$ axis. Faint dotted lines in FIG. 10B $In_{Sc}$ depict a possible third coaxial revolute R joint. However, it is not required in practice and over constrains the other two coaxial revolute R joints. Four parallel connected actuators, controlling the linear positions $x_{A1}^{A1}$, $x_{C1}^{C1}$, $x_{A2}^{A2}$, $x_{C2}^{C2}$ of links $L_{A1}$, $L_{C1}$ $L_{A2}$, $L_{C2}$ adjust the linear $\hat{X}_W$, $\hat{Y}_W$ position of the tool-link $L_T$ and angular orientation of its $\hat{Z}_T$ axis with 4-DOF. Short arrows identify active prismatic P joints in schematic $In_{Sc}$ of FIG. 10B. Linear position $z_{Z2}{}^W=0$ is fixed for the 4-DOF manipulator in FIG. 10B, with joint notation (2-(PP$\underline{P}$RRR)) (2-(PP$\underline{P}$RR)). Notation '2-( )' indicates that two serial kinematic linkages connect in parallel. The extra R in the first two serial kinematic linkages (PP$\underline{P}$RRR) accounts for the revolute joints along $\hat{Z}_T$ to accommodate relative twist angle $\theta_{BD_Z}$ between links $L_{B1}$, $L_{B2}$ and $L_{D1}$, $L_{D2}$.

The hybrid serial-parallel coupled Cartesian manipulator from FIGS. 8A-8D interleaves with the one from FIGS. 9A-9D so that link $L_{B2}$ from the second hybrid serial-parallel coupled Cartesian manipulator is between links $L_{B1}$, $L_{D1}$ from the first hybrid serial-parallel coupled Cartesian manipulator. Similarly, link $L_{D1}$ from the first hybrid serial-parallel coupled Cartesian manipulator is between links $L_{B2}$, $L_{D2}$ from the second hybrid serial-parallel coupled Cartesian manipulator. This allows bearings for the passive revolute R joints to be spaced far apart from each other, along the tool-link $L_T$, as seen in FIGS. 10A-10D. Bearing pairs that are spaced far apart from each other support high moment loads with high bending stiffness.

Figure 10D:
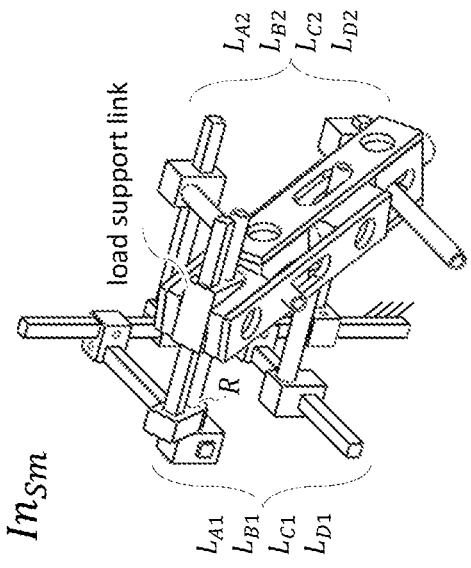
Figure 10A:
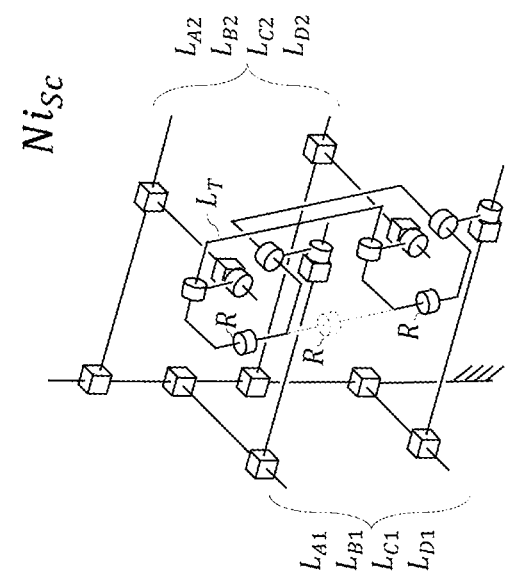
Figure 10B:
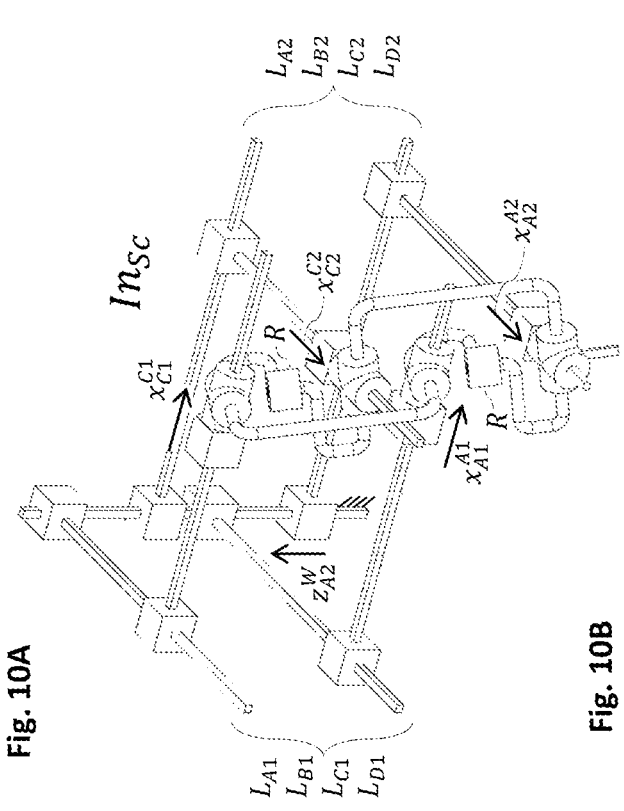

The load support link in FIG. 10D solid model In$_{Sm}$ supports external loads applied to the tool-link $L_T$ and the weight of the links and joints along the tool-link. A passive (PPRP) serial kinematic linkage connects the load support link to the base link $L_W$. The revolute R joint allows the load support link to swivel with the manipulator. For illustration, FIG. 10D shows the manipulator In$_{Sm}$ with the load support link pointing up. However, typically it points down to support loads applied to the tool-link from tools like machining spindles for example.

Parallel Connected 5-DOF coupled Cartesian manipulator. Additionally controlling the prismatic joint linear position $z_{A2}{}^W$ along vertical link $L_W$ adds position control $z_T{}^W$ along $\hat{Z}_W$ of the tool-link $L_T$ for 5-DOF in a hybrid serial-parallel configuration, with joint notation ($\underline{PPP}$RRR)-(PP$\underline{P}$RRR)-(2-(PP$\underline{P}$RR)).

Parallel connected 5-DOF coupled Cartesian manipulator with movable base. The two parallel connected manipulator embodiments In$_{Sc}$, In$_{Sm}$ in FIGS. 11A, 11B control the 5-DOF position and orientation of tool-link $L_T$ relative to movable base link $L_{Bs}$. An active prismatic joint is connected to the movable base link $L_{Bs}$ that enable the base movable along the axe $z_{Bs}{}^W$. One of the prismatic joints along $L_W$ is fixed and the other three prismatic joints along $L_W$ are passive to accommodate changes in distance, between the links, as the tool-link orientation changes. Joint notation for the parallel coupled Cartesian manipulator in FIGS. 11A, 11B is (P$\underline{P}$RRR)-(PP$\underline{P}$RRR)-(2-(PP$\underline{P}$RR))-($\underline{P}$) for 5-DOF control, where ($\underline{P}$) represents an active prismatic joint actuates the movable base. Notice that only one prismatic $\underline{P}$ joint is active per serial kinematic linkage indicating that both manipulator embodiments In$_{Sc}$ and In$_{Sm}$ in FIGS. 11A, 11B connect in parallel. The five active prismatic $\underline{P}$ joints, with linear positions $x_{A1}{}^{A1}$, $x_{C1}{}^{C1}$, $x_{A2}{}^{A2}$, $x_{C2}{}^{C2}$, $z_{A2}{}^{\overline{W}}$ are identified with short arrows in FIG. 11A schematic In$_{Sc}$. FIG. 11B drawing In$_{Sm}$ is a solid model of the 5-DOF parallel coupled Cartesian manipulator based on commercially available hardware. The overall design of manipulator In$_{Sm}$ in FIG. 11B is compact and symmetric providing space to attach tools in any one of the four quadrants around the tool-link.

TABLE 2

FIGS. 6-11, topologies and features of coupled Cartesian manipulator sub-assemblies.

| Manipulator | FIGS. | Joint notation | Features |
|---|---|---|---|
| Serial Cartesian manipulator | 6A, 6C Ni$_{Sc}$ Ni$_{Sm}$ | (PP$\underline{P}$RRR) | 6-DOF<br>Comparable to conventional 5-axis CNC with rotating spindle |
| Serial Cartesian manipulator with intersecting joint axes | 6B, 6D In$_{Sc}$ In$_{Sm}$ | (PP$\underline{P}$RRR) | Intersecting joint axes are more compact<br>No lateral loads due to axial linear actuation forces<br>Precise control of tool-link directly through intersecting joints<br>Simple inverse kinematics |
| Hybrid serial-parallel 5-DOF coupled Cartesian manipulator with non-parallel joint axes | 7A-7D Ni$_{Sc}$ Ni$_{Sm}$ In$_{Sc}$ In$_{Sm}$ | (PP$\underline{P}$RRR) – (PP$\underline{P}$RR) | Hybrid serial-parallel manipulator<br>Tool-link manipulated at two locations using two XYZ Cartesian manipulators |
| Hybrid serial-parallel 5-DOF coupled Cartesian manipulator with parallel joint axes | 8A-8D, 9A-9D Ni$_{Sc}$ Ni$_{Sm}$ In$_{Sc}$ In$_{Sm}$ | (PP$\underline{P}$RR) – (PP$\underline{P}$RR) | Hybrid serial-parallel manipulator<br>Eliminates need for one revolute joint<br>Links $L_A$, $L_B$, $L_T$ may be a single rigid body |
| Parallel connected 4-DOF coupled Cartesian manipulator | 10A-10D Ni$_{Sc}$ Ni$_{Sm}$ In$_{Sc}$ In$_{Sm}$ | (2 – (PP$\underline{P}$RRR)) – (2 – (PP$\underline{P}$RR)) | Two coupled Cartesian manipulator embodiments from FIGS. 8A-8D, 9A-9D coupled together in parallel<br>Four identical linear actuators enable 4-DOF tool-link position and orientation control<br>Interleaved coupled Cartesian manipulator embodiments<br>Link $L_{B2}$ is between links $L_{B1}$, $L_{D1}$<br>Link $L_{D1}$ is between links $L_{B2}$, $L_{D2}$<br>Rotary bearings for revolute joint, along tool-link axis, are spaced far apart from each<br>Provide high moment stiffness |
| Parallel connected 5-DOF coupled Cartesian manipulator | 10A-10D Ni$_{Sc}$ Ni$_{Sm}$ In$_{Sc}$ In$_{Sm}$ | (PP$\underline{P}$RRR) – (PP$\underline{P}$RRR) – (2 – (PP$\underline{P}$RR)) | Actuated prismatic joint position $z_{A2}{}^W$ enables 5-DOF control of tool-link |

TABLE 2-continued

FIGS. 6-11, topologies and features of coupled Cartesian manipulator sub-assemblies.

| Manipulator | FIGS. | Joint notation | Features |
| --- | --- | --- | --- |
| Parallel connected 5-DOF coupled Cartesian manipulator with movable base | 11A, 11B In$_{Sc}$ In$_{Sm}$ | (P<u>P</u>RRR) – (PPP<u>P</u>RRR) – (2 – (PPP<u>P</u>RR)) – (<u>P</u>) | Parallel connected 5-DOF manipulator 5-DOF control of tool-link L$_T$ relative to movable base L$_{Bs}$ |

FIG. 12 is a two-dimensional schematic of the coordinate frames, links and joints of the manipulator. FIG. 12 identifies object frame F$_O$ 10; workspace frame F$_W$ 11; frame F$_A$ link L$_A$ 14; frame F$_B$ link L$_B$ 16; frame F$_B$ link L$_B$ 16; frame F$_C$ link L$_C$ 24; frame F$_D$ link L$_D$ 26; frame F$_T$ tool-link L$_T$ 12; and frame F$_V$ tool L$_V$ 50.

Figure 13:
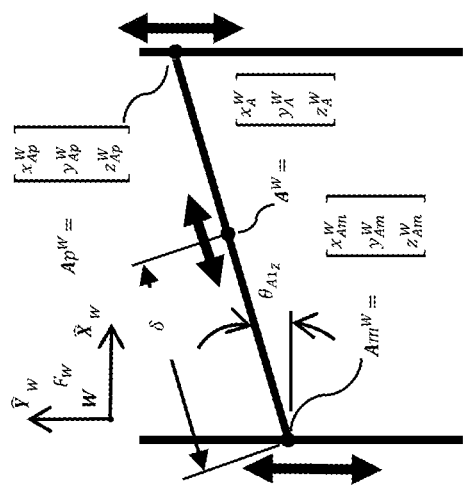
FIG. 13. Two-dimensional schematic of three prismatic joints enabling planar linear and angular motion.

FIG. 13 is a two-dimensional schematic illustrating how three linear actuators implement linear and angular motion. The two linear position coordinates $x_A^W$, $y_A^W$ and the angle $\theta_{A_Z}$ of link L$_A$ is controlled with the three linear actuators 19, 21, 23 along linear rail-links 18, 20, 22 respectively, so that $\theta_{A_Z}$=a tan 2($y_{Ap}^W$-$y_{Am}^W$, $x_{Ap}^W$-$x_{Am}^W$), $x_A^W$=$x_{Am}^W$+$\delta$ cos ($\theta_{A1_Z}$) and $y_A^W$=$y_{Am}^W$+$\delta$ sin($\theta_{A_Z}$) where $\delta$ is the distance from rail-link 20 along rail-link 18 to link L$_A$. The inverse kinematics equations are $\delta$=($x_A^W$-$x_{Am}^W$)cos($\theta_{A_Z}$), $y_{Am}^W$=$y_A^W$-$\delta$ sin($\theta_{A_Z}$), $y_{Ap}^W$=($x_{Ap}^W$-$x_{Am}^W$)tan($\theta_{A_Z}$), respectively.

Figure 14:
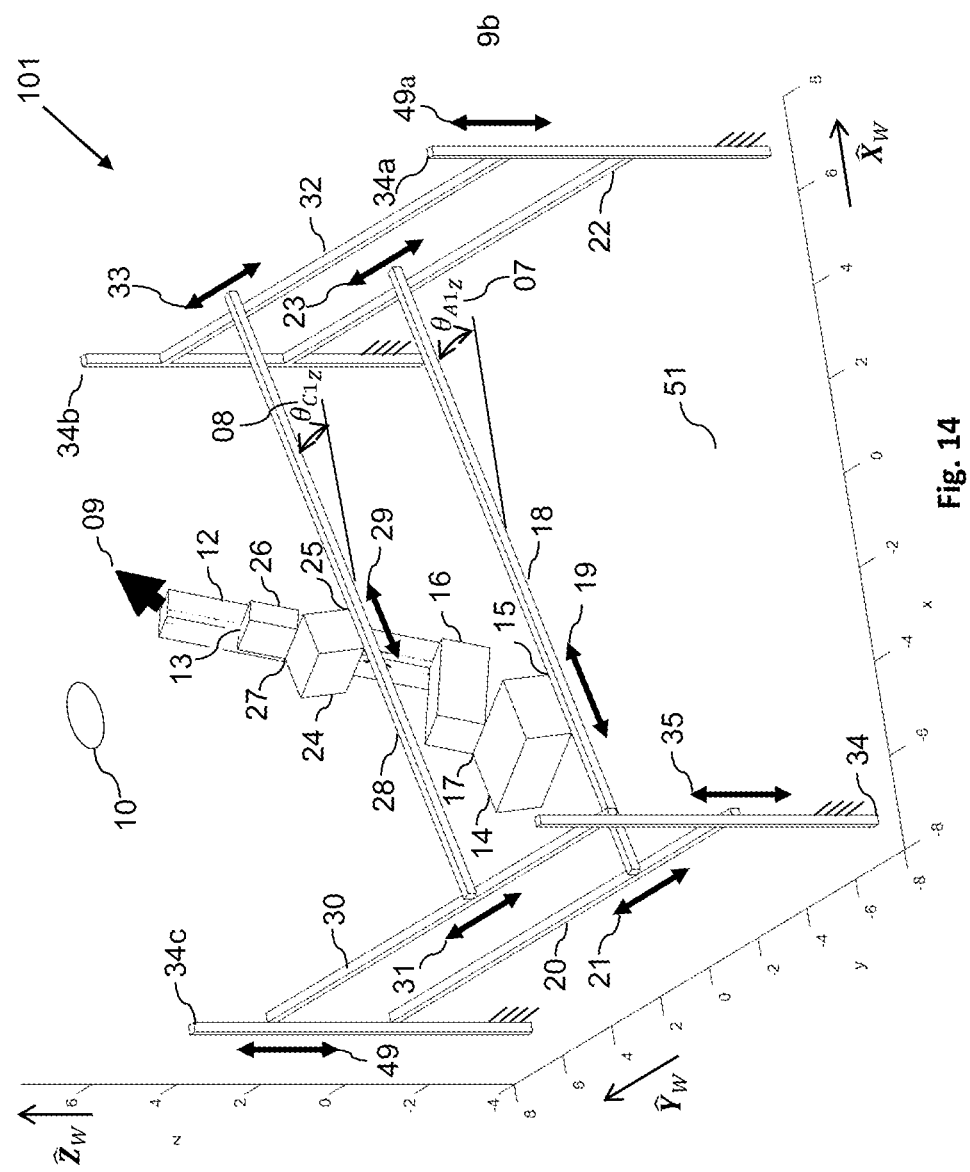
FIG. 14. Hybrid serial-parallel 6-DOF coupled Cartesian manipulator with parallel joint axes.

FIG. 14 is a 3D (three dimension) view of a hybrid serial-parallel 6-DOF coupled Cartesian manipulator with parallel joint axes 101 of the present teachings, which manipulates tool frame F$_T$ 09, connected to tool-link L$_T$ 12, to interact with object 10 in the workspace. For example, tool frame F$_T$ 09 may be orientated by Z-X-Z sequential intrinsic Euler angles $\theta_{T_Z}$, $\theta_{T_X}$, $\theta_{T_Z}$ relative to the tool-link frame F$_T$. Tool-link L$_T$ 12 is also known as a common link. Link L$_A$ 14 is oriented by angle $\theta_{A_Z}$ 07 around axis $\hat{Z}_W$. Link L$_A$ 14 connects to rail-link 18 with coaxial revolute-prismatic (cylindrical) joint 15 that enables angular motion $\theta_{A_X}$, and linear motion coordinate $x_A^W$ along rail-link 18. Linear actuator 19 enables motion of link L$_A$ 14 along rail-link 18. Heavy solid double-headed arrows in the figures depict linear actuators. Link L$_B$ 16 connects to link L$_A$ 14 with revolute joint 17 that enables angular motion $\theta_{B_Y}$. Link L$_B$ 16 and link L$_A$ 14, combined together, constitute a coupling link. Similarly, link L$_C$ 24 and Link L$_D$ 26 constitute another coupling link. Coaxial revolute joint 13 connects links L$_B$ 16, L$_D$ 26, L$_T$ 12 to accommodate relative twist angle $\theta_{BD_Z}$ between links L$_B$ 16 and L$_D$ 26. Rail-links 20 and 22 support rail-link 18 at each end respectively. Linear actuators 21 and 23 control the $y_A^W$ coordinate of position $A^W$ and the orientation angle $\theta_{A_Z}$. Link L$_C$ 24 orientates by angle $\theta_{C_Z}$ 08 around axis Z. Link L$_C$ 24 connects to rail-link 28 with coaxial revolute-prismatic (cylindrical) joint 25 that enables angular motion $\theta_{C_X}$ and linear motion coordinate $x_C^W$ along rail-link 28. Linear actuator 29 enables motion of link L$_C$ 24 along rail-link 28. Link L$_D$ 26 connects to link 24 with revolute joint 27 that enables angular motion $\theta_{D_Y}$. Rail-links 30 and 32 support rail-link 28 at each end respectively. Rail-links 20, 22, 30, 32 are supported at each end by rail-links 34, 34a, 34b, 34c which are supported on base 51. Rail-links 34, 34a, 34b, 34c are also known as supports fixed to base 51. Rail-links 20, 30, 18, 28, 22, 32 are also known as rails. Linear actuator 35, controls the position coordinate $z_A^W$ of link L$_A$ 14 and the position coordinates $z_A^W$ of rail-links 18, 20, 22 along rail-links 34, 34a, 34b, 34c. In the following description, the tool-link 12 rigidly connects to link L$_B$ 16 so that linear actuator 35 controls the position coordinate $z_T^W$ of link L$_T$ 12. Alternatively, the tool-link 12 rigidly connects to link L$_D$ 26, so that linear actuator 49 controls the position coordinate $z_T^W$ of link L$_T$ 12. Assuming that the tool-link 12 rigidly connects to link L$_B$ 16, if the positions of rail-links 28, 30, 32 along rail-links 34, 34a, 34b, 34c are fixed, then the position coordinate $z_C^W$ of link L$_C$ 24 is also fixed In this case, joint 13 must be sliding to accommodate changes in the distance between link L$_A$ 14 and link L$_C$ 24 as the orientation angle of tool-link L$_T$ 12 changes. Optionally, prismatic joints may replace linear actuators 49, so that the positions of rail-links 28, 30, 32 are free to move along rail-links 34, 34a, 34b, 34c. In this case the distance between link L$_A$ 14 and link L$_C$ 24 can be fixed, so that joint 13 does not have to be sliding. The two rail-links 18, 28 are not constrained to be parallel, so that in general angles $\theta_{A_Z} \neq \theta_{C_Z}$. In this case link L$_B$ 16 and link L$_D$ 26 connect by revolute joint 13 to accommodate relative twist angle $\theta_{BD_Z}$ between links L$_B$ 16 and L$_D$ 26. If angles $\theta_{A_Z}$, $\theta_{C_Z}$ are fixed then the manipulator of FIG. 14 has 5-DOF. Otherwise, the manipulator of FIG. 14 has 6-DOF if linear actuators 21, 23 move differentially to control angle $\theta_{A_Z}$ and tool-link L$_T$ 12 rigidly connects to link L$_B$ 16; or if linear actuators 31, 33 move differentially to control angle $\theta_{C_Z}$, and tool-link L$_T$ 12 rigidly connects to link L$_D$ 26. Through control of angles $\theta_{A_Z}$ and $\theta_{C_Z}$, and attachment to tool-link L$_T$ 12 between links L$_B$ 16 and L$_D$ 26, it can be altered sequentially to enable full 360° rotation of tool-link L$_T$ 12 around its longitudinal axis. Alternatively, linear actuator 33 may be controlled to maintain a fixed relative angle between links L$_A$ 14 and L$_C$ 24. For example, $\theta_{A_Z} = \theta_{C_Z}$ for a preferred embodiment of a manipulator with parallel joint axes $\hat{X}_B \| \hat{X}_D$, so that revolute joints 17, 27 are parallel and joints 15, 25 are parallel. In this case, links 12, 16, 26 can be connected without a revolute joint 13 since there is no relative twist angle $\theta_{BD_Z}$ between links L$_B$ 16 and L$_D$ 26 for all positions of the parallel joint axes $\hat{X}_A \| \hat{X}_C$ embodiment ($\theta_{BD_Z}$=0). Without a revolute joint 13, rail-links 18, 28 are constrained to be parallel, linear actuator 33 is redundant with linear actuator 23, so that linear actuator 33 may be replaced with a prismatic joint. Optionally, linear actuator 33 position may be electronically synchronized to that of linear actuator 23. Linear actuators 31, 33 can be actuated to keep rail-links 18, 28 parallel. Either way, six independently controlled linear actuators are sufficient to provide 6-DOF positioning and orientation control of the tool frame 09. Alternatively, angles $\theta_{A_Z}$, $\theta_{C_Z}$ can be fixed for 5-DOF control of the tool frame 09. In this case, a preferred embodiment having both angles $\theta_{A_Z}$ and $\theta_{C_Z}$ are zero ($\theta_{A_Z} = \theta_{C_Z} = 0°$, so that link 18 is perpendicular to link 21 and link 28 is perpendicular to link 31; forming Cartesian positioners for the three-dimensional positions of link L$_A$ 14 and link L$_C$ 24 respectively.

1. a positioning device that manipulates in 6-DOF, i.e. translatable in three spatial axes and rotatable around three spatial axes, the position and orientation of a platform (tool-link) 12 relative to object 10 in the workspace; where
2. the position and orientation of the tool-link 12 is manipulated at two separate revolute joints 17, 27 connected to the tool-link 12 through links 16, 26, respectively; where
3. either one of the links 16 or 26 rigidly connects to tool-link 12; where
4. either one of the other links 26 or 16 connects to tool-link 12 through a revolute or revolute-prismatic (cylindrical) joint 13; where
5. each one of the two revolute joints 17, 27 is also connected to joints 15, 25 through links 14, 24 respectively; where
6. the axes of rotation of the joints 15, 25 are generally perpendicular to the axes of rotation of the revolute joints 17, 27 respectively; where
7. each one of the two joints 15, 25 connects to separate positioners; where
8. each one of the two separate positioners manipulates one of the joints 15, 25 in 4-DOF, consisting of translation along three spatial axes and rotation around one axis, controlled by linear actuators 19, 21, 23, 35 and 31, 33, 29, 49 respectively; where
9. the rotation axes of the two separate 4-DOF positioners are parallel; where
10. the rotation axes of the two separate 4-DOF positioners are generally perpendicular to the plane of motion of linear actuators 19, 21, 23 and 29, 31, 33; where
11. the translation of one of the two separate 4-DOF positioners along a direction parallel to the rotation axes of the two separate 4-DOF positioners, may be passive, i.e. unactuated, if joint 13 is a revolute joint, i.e. not a revolute-prismatic (cylindrical) joint; where
12. the translation of one of the two separate 4-DOF positioners, along a direction parallel to the rotation axes of the two separate 4-DOF positioners, may be fixed, i.e. nonmoving, if joint 13 is a revolute-prismatic (cylindrical) joint.
13. for a preferred embodiment, the axes of rotation of the revolute joints 17, 27 are parallel with each other eliminating revolute joint 13; where
14. if joints 17, 27 are parallel, then the angular rotation of the two separate 4-DOF positioners are synchronized so that rotation angles 07 and 08 are identical; where
15. if joints 17, 27 are parallel, then prismatic joint 13 may enable mechanical synchronization of the angular rotation of the two separate 4-DOF positioners.

Figure 15:
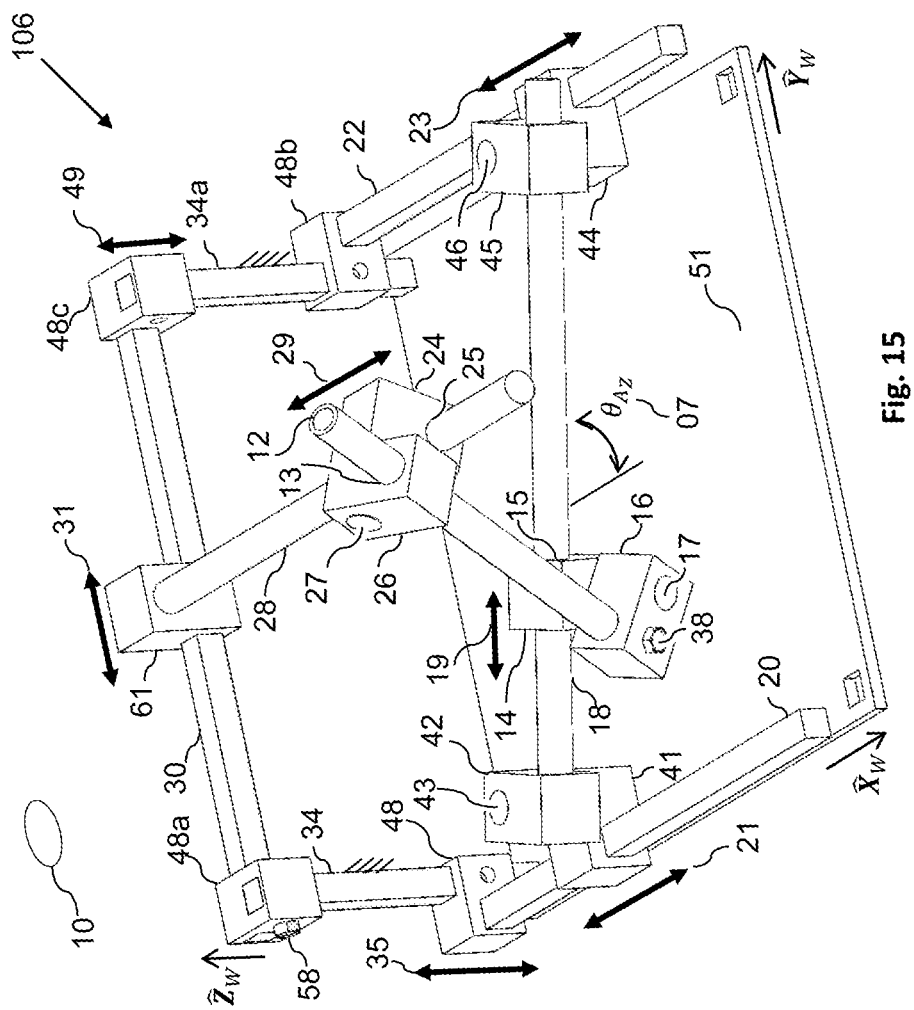
FIG. 15. Hybrid serial-parallel 6-DOF coupled Cartesian manipulator with platform (tool-link) connected to one coupling link through a revolute joint and rigidly connected to the other coupling link.

FIG. 15. is a 3D view of a hybrid serial-parallel 6-DOF coupled Cartesian manipulator 106. The tool-link $L_T$ 12 rigidly connects to link $L_B$ 16 with fastener 38 and is free to rotate in link $L_D$ 26 via revolute joint 13. Differentially positioning linear actuators 21, 23 controls angle $\theta_{A_Z}$ 07 of link 18. Angle $\theta_{C_Z}$ of link 28 is fixed ($\theta_{C_Z}=0$). Link 14 is free to slide and rotate on rail-link 18 through revolute-prismatic (cylindrical) joint 15. Link 24 is free to slide and rotate on rail-link 28 through revolute-prismatic (cylindrical) joint 25. For another preferred embodiment, joint 25 could be a spherical joint with three rotational degrees-of-freedom. Link 41 slides on rail-link 20. Link 42 connects to link 41 through revolute joint 43. Link 44 slides on rail-link 22. Link 45 connects to link 44 through revolute joint 46. Rail-link 18 is fixed in link 42 and free to slide in link 45. Link 61 slides on rail-link 30. Rail-link 28 is fixed in link 61. Links 48, 48a and links 48b, 48c slide on rail-links 34 and 34a respectively. Rail-links 20, 22 are fixed in links 48, 48b respectively. Rail-link 30 is fixed in links 48a 48c. Linear actuator 35 controls the position of link 48 along rail-link 34. Rail-link 30 optionally rigidly connects to rail-link 34 with fastener 58. In this case tool-link $L_T$ 12 must be free to slide linearly in a revolute-prismatic (cylindrical) joint 13 in link $L_D$ 26 to accommodate changes in distance ($\delta z_T^{B-D}=|z_T^B-z_T^D|$) between links $L_B$ 16, $L_D$ 26 due to changes in tool-link $L_T$ 12 orientation. Alternatively, tool-link $L_T$ 12 is not free to slide linearly in revolute joint 13 in link $L_D$ 26. In this case, rail-link 30 must be free to slide linearly along rail-links 34, 34a or optionally be actively positioned by linear actuator 49. Rail-link 32 and rail-links 34b and 34c from FIG. 14 are omitted from FIG. 15, however they can be included for structural support or to over-constrain the bearings to remove mechanical play.

1. a positioning device that manipulates in 6-DOF, i.e. translatable in three spatial axes and rotatable around three spatial axes, the position and orientation of a platform (tool-link) 12 relative to object 10 in the workspace; where
2. the position and orientation of the tool-link 12 is manipulated at revolute joint 17 connected to the tool-link 12 through link 16; where
3. the tool-link 12 connects to link 26 by combined revolute-prismatic (cylindrical) joint 13; where
4. the axes of the revolute portion and prismatic portion of the revolute-prismatic (cylindrical) joint 13 are not necessarily coaxial; where
5. the position and orientation of link 26 is manipulated at revolute joint 27; where
6. each one of the two revolute joints 17, 27 is also connected to joints 15, 25 respectively through links 14, 24 respectively; where
7. the axes of rotation of the joints 15, 25 are generally perpendicular to the axes of rotation of the revolute joints 17, 27 respectively; where
8. each one of the two joints 15, 25 connects to two separate positioners; where
9. one of the two separate positioners manipulates joint 15 in 4-DOF, consisting of translation along three spatial axes and rotation around one axis, controlled by linear actuators 19, 21, 23, 35; where
10. the rotation axis of the 4-DOF positioners is generally perpendicular to the plane of motion of linear actuators 19, 21, 23; where
11. the other separate positioner manipulates joint 25 in two linear degrees-of-freedom, consisting of translation along two spatial axes, controlled by linear actuators 29, 31.

Figure 16:
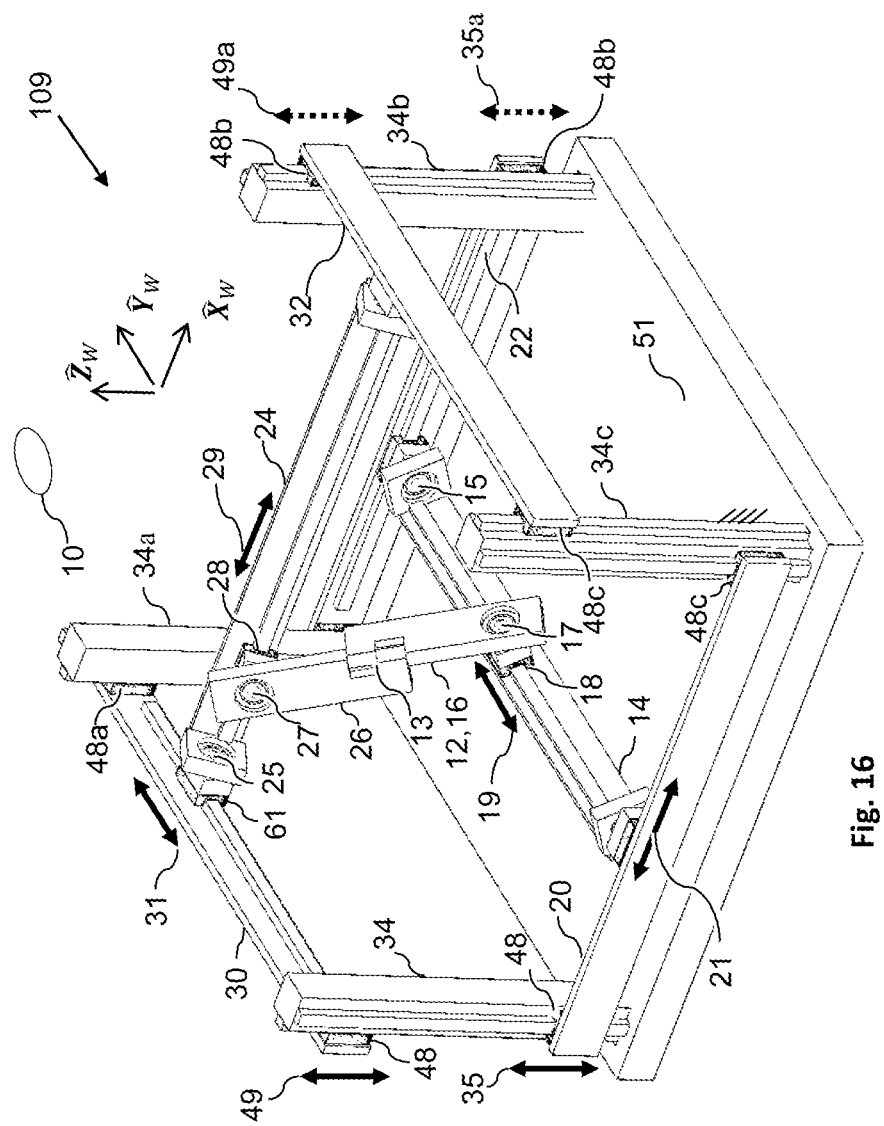
FIG. 16. Hybrid serial-parallel 5-DOF coupled Cartesian manipulator with non-coaxial prismatic and revolute joints.

FIG. 16 is a 3D view of a hybrid serial-parallel 5-DOF coupled Cartesian manipulator 109. Revolute joint 15 and prismatic joint 18 are not coaxial and revolute joint 25 and prismatic joint 28 are not coaxial. The tool-link $L_T$ 12 and link $L_B$ 16 are one and the same rigid body. Linear actuator 35 controls the position coordinate $z_T^W$ of link $L_T$ 12. The distance ($\delta z_T^{B-D}=|z_T^B-z_T^D|$) along the tool-link axis $\hat{Z}_T$, between links $L_B$ 16, $L_D$ 26 is fixed. The distance ($\delta z_{C-A}^W=|z_C^W-z_A^W|$) along the workspace $\hat{Z}_W$ axis, between links $L_A$ 14, $L_C$ 24 is variable based on links 48 that slide on rail-links 34. Optionally, tool-link $L_T$ 12 can be connected to link $L_D$ 26 so that the position coordinate $z_T^W$ of link $L_T$ 12 is controlled by linear actuator 49 and links 20, 22 are free to slide on rail-links 34, 34a, 34b, 34c. Angles $\theta_{A_Z}$ and $\theta_{C1_Z}$ are fixed ($\theta_{A_Z}=\pi/2$, $\theta_{C1_Z}=0$). Revolute joint 13 connects link $L_B$ 16 and link $L_D$ 26 to accommodate relative twist angle $\theta_{BD_Z}$ between links $L_B$ 16 and $L_D$ 26. For another preferred embodiment, axes of links $L_A$ 14 and $L_C$ 24 are parallel.

Angles $\theta_{A_z}$ and $\theta_{C1_z}$ are fixed ($\theta_{A_z}=0$, $\theta_{C1_z}=0$). Revolute joints 15, 25 axes are parallel and revolute joints 17, 27 axes are parallel. Revolute joint 15 and sliding joint 18 are not coaxial, and revolute joint 25 and sliding joint 28 are not coaxial. Revolute joints 17, 27 are connected through a common link 12.

Figure 17:
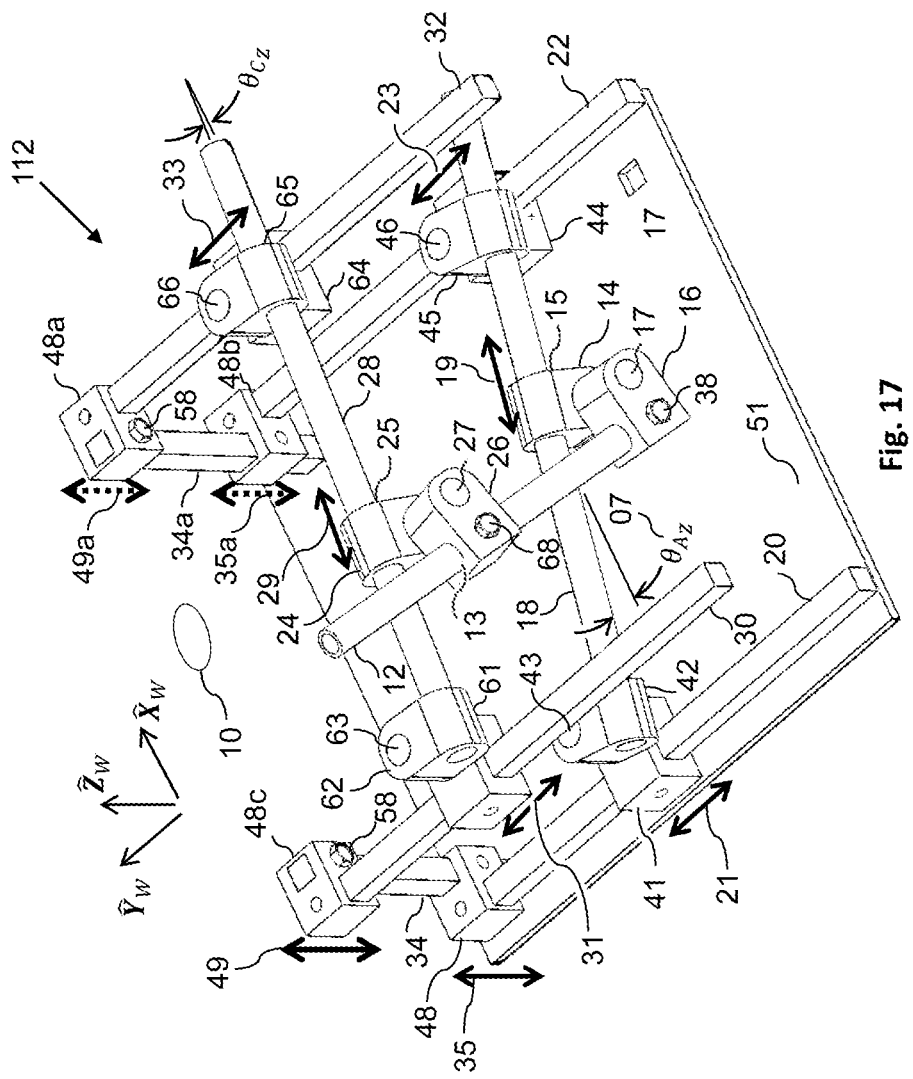
FIG. 17. Hybrid serial-parallel 6-DOF coupled Cartesian manipulator with tool-link connected to one coupling link through a revolute joint and rigidly connected to the other coupling link.

FIG. 17 is a 3D view of a hybrid serial-parallel 6-DOF coupled Cartesian manipulator 112 of the present teachings, with tool-link $L_T$ 12 connected to one coupling link through a revolute joint and rigidly connected to the other coupling link. Angles $\theta_{A_z}$, $\theta_{C_z}$ are variable in FIG. 17. The present teachings manipulate the position and orientation of a tool-link 12, with two sets of revolute joints, each with two rotational degrees-of-freedom and with parallel-joint-axes, $\hat{X}_A \| \hat{X}_C$. For another preferred embodiment, the rotary-axes of joints 15, 25 do not have to be parallel with the linear axes 18, 28.

1. a positioning device that manipulates in 6-DOF, i.e. translatable in three spatial axes and rotatable around three spatial axes, the position and orientation of a platform (tool-link) 12 relative to object 10 in the workspace; where
2. the orientation and position of the tool-link 12 is controlled at two separate revolute joints 17, 27 along the tool-link 12; where
3. the revolute joints 17, 27 connect to links 16, 26 respectively; where
4. either one of links 16 or 26 rigidly connects to tool-link 12 with fasteners 38, 68 respectively; where
5. either one of the other links 26 or 16 connects to tool-link 12 either rigidly or through either revolute or revolute-prismatic (cylindrical) joint 13; where
6. each one of the revolute joints 17, 27 connects to the other revolute joints 15, 25 through separate links 14, 24 respectively; where
7. the rotation axes of revolute-prismatic (cylindrical) joints 15, 25 are generally perpendicular to the rotation axes of revolute joints 17, 27 respectively; where
8. linear actuators 19, 29, translatable along rail-links 18, 28, control the linear positions of joints 15, 25; where
9. differential motion of linear actuators 19, 29 controls an orientation angle of tool-link 12; where
10. common motion of linear actuators 19, 29 controls a linear position of tool-link 12; where
11. rail-link 18 rigidly connects to link 42 or 45; where
12. rail-link 18 connects to the other link 45 or 42 through a prismatic joint; where
13. links 42, 45 connect to links 41, 44 through revolute joints 43, 46 respectively; where
14. rail-link 28 rigidly connects to link 62 or 65; where
15. rail-link 28 connects to the other link 65 or 62 through a prismatic joint; where
16. links 62, 65 connect to links 61, 64 through revolute joints 63, 66 respectively; where
17. the rotation axes of revolute joints 43, 46, 63, 66 are parallel; where
18. linear actuators 21, 23 control of the positions of links 41, 44, translatable along rail-links 20, 22, respectively; where
19. linear actuators 31, 33 control of the positions of links 61, 64, translatable along rail-links 30, 32, respectively; where
20. differential motion of linear actuators 31, 33 relative to linear actuators 21, 23 controls an orientation angle of tool-link 12; where
21. common motion of linear actuators 21, 23, 31, 33 controls a linear position of tool-link 12; where
22. differential motion of linear actuators 21, 23 controls the angle $\theta_{A1_z}$ 07 of rail-link 18; where
23. angle $\theta_{A1_z}$ 07 controls the orientation of tool-link 12 around its longitudinal axis, if the tool-link 12 connects to link 16; where
24. differential motion of linear actuators 31, 33 controls the angle $\theta_{C1_z}$ of rail-link 28; where
25. angle $\theta_{C1_z}$ controls the orientation of tool-link 12 around its longitudinal axis if the tool-link 12 connects to link 26; where
26. rail-links 20, 22, 30, 32 are supported on rail-links 34 that are parallel to each other and generally perpendicular to rail-links 34, 34a; where
27. rail-links 34, 34a connect to base 51; where
28. control of the position of rail-links 20, 22 is optionally provided by linear actuators 35, or 35a translatable along rail-links 34, 34a respectively; where
29. control of the position of rail-links 30, 32 is optionally provided by linear actuators 49, or 49a translatable along rail-links 34, 34a.

Figure 18:
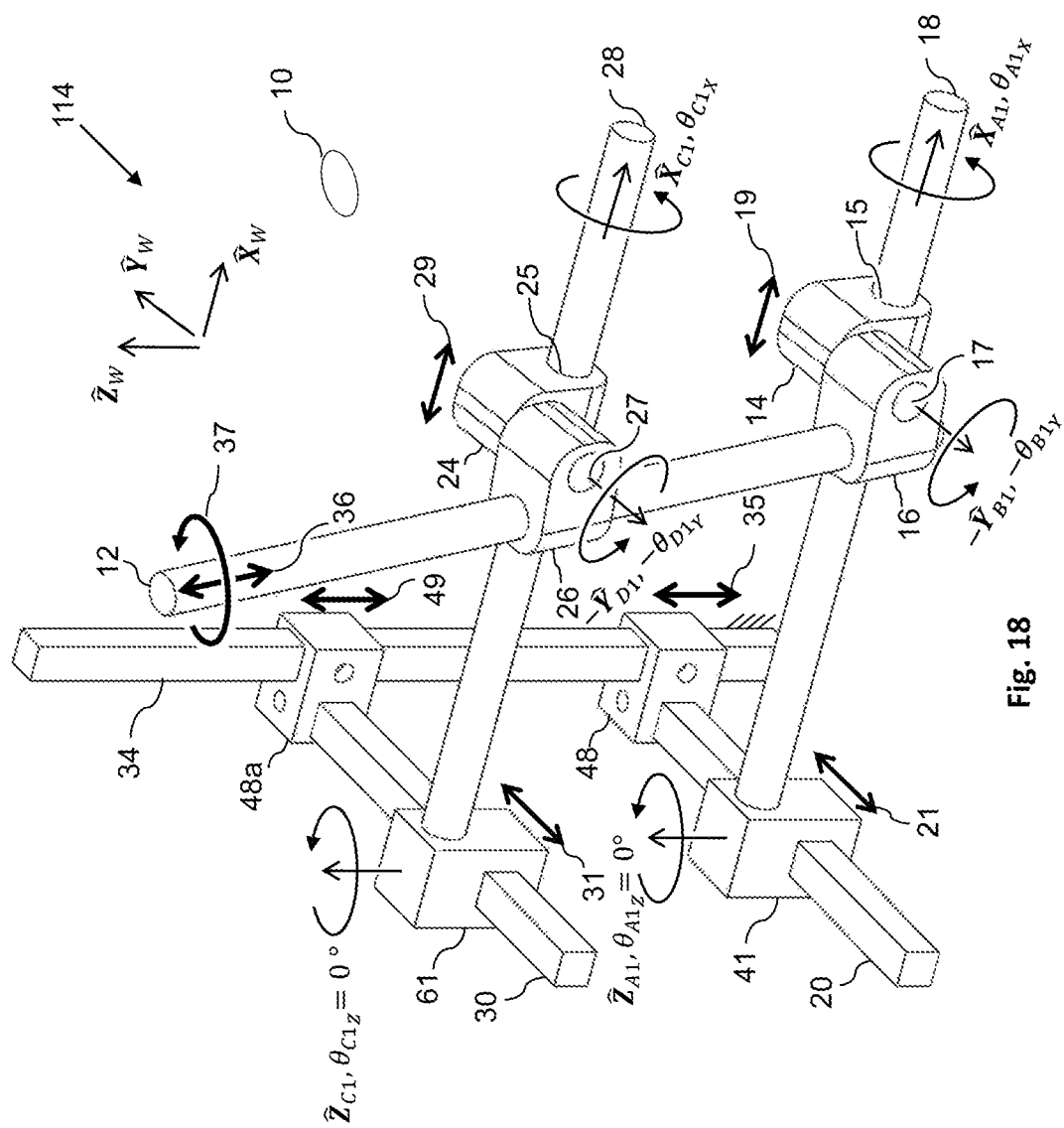
FIG. 18. Hybrid serial-parallel, multi degrees-of-freedom, coupled Cartesian manipulator with parallel joint axes.

FIG. 18 is a 3D view of a hybrid serial-parallel, multi degrees-of-freedom, coupled Cartesian manipulator 114 of the present teachings, with parallel joint 15, 25 axes and parallel joint 17, 27 axes. Linear actuators 19, 21, 29, 31, indicated by heavy double-headed arrows manipulate the tool-link $L_T$ 12 with 4-DOF. Linear actuator 21 moves link 41 on rail-link 20. Linear actuator 31 moves link 61 on rail-link 30. Linear actuator 19 moves link 14 on rail-link 18. Linear actuator 29 moves link 24 on rail-link 28. Angles $\theta_{A_z}$ and $\theta_{C_z}$ are fixed ($\theta_{A_z}=0$, $\theta_{C_z}=0$). Joints 15, 25 are combined coaxial revolute-prismatic (cylindrical) joints. Joint 15 accommodates sliding and rotary motion of link $L_A$ 14 relative to rail-link 18, and joint 25 accommodates sliding and rotary motion of link $L_C$ 24 relative to rail-link 28. Since joint 17, 27 axes are parallel there is no relative twist angle $\theta_{BD_z}$ between links $L_B$ 16 and $L_D$ 26 around their common $\hat{Z}_B^W$, $\hat{Z}_D^W$ axes ($\theta_{BD_z}=0$). However, tool-link $L_T$ 12 may be free to slide relative to link 16 or 26 to accommodate changes in distance $\delta z_{D-B}^W = |z_D^W - z_B^W|$ between links $L_B$ 16 and $L_D$ 26 as the orientation of tool-link $L_T$ 12 changes. In this case, links 48, 48a may connect rigidly to rail-link 34. Alternatively, links 12, 16, 26 may be connected together forming a single rigid body. In this case, links 48 or 48a must be free to slide relative to rail-link 34 to accommodate changes in distance ($\delta z_{C-A}^W = |z_C^W - z_A^W|$) between links $L_A$ 14 and $L_C$ 24 as the orientation of tool-link $L_T$ 12 changes. Optionally, the position of link 48 can be actively controlled using optional linear actuator 35 for 5-DOF control of the tool-link 12 if the tool-link 12 rigidly connects to link $L_B$ 16. Alternatively, the position of link 48a can be actively controlled using optional linear actuator 49 for 5-DOF control of the tool-link 12 if the tool-link 12 rigidly connects to link $L_D$ 26. Alternatively, 5-DOF and 6-DOF control of the tool-link 12 may be implemented with tool-link linear actuator 36 and tool-link rotary actuator 37 respectively, which connects in series with tool-link 12. Up to three additional rail-links, like 34 can be added in adjacent corners for structural support, along with associated rail-links like 20, 30 and associated links like 41, 61, 48. Alternatively, joints 15, 25 may be implemented with two separate rotating bearings at each end of rail-links 18, 28 as depicted in FIG. 16.

Figure 19:
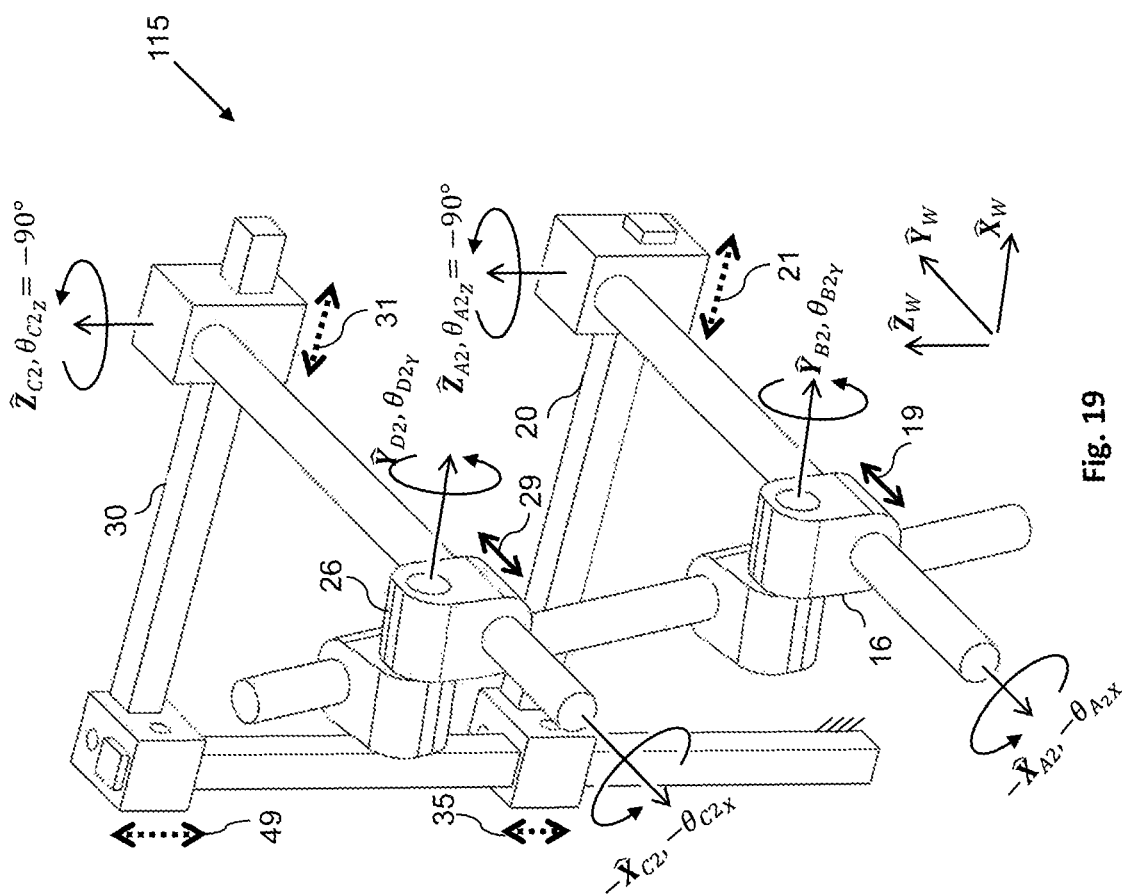
FIG. 19. Hybrid serial-parallel, multi degrees-of-freedom, coupled Cartesian manipulator that rotated −90° relative to the manipulator in FIG. 18.

FIG. 19 is a 3D view of a hybrid serial-parallel, multi degrees-of-freedom, coupled Cartesian manipulator 115 of the present teachings. It is the same as manipulator 114 in FIG. 18 except that it is rotated −90° around the $\hat{Z}_W$ axis compared to manipulator 114, i.e. link $L_A$ 14 in FIG. 18 is rotated by angle $\theta_{A_z}=-90°$ as identified in FIG. 19, and link $L_C$ 24 in FIG. 18 is rotated by angle $(\theta_{C_z}=-90°$ as identified in FIG. 19. Manipulator 115 is a parallel joint axes manipulator, so there is no relative twist angle $\theta_{BD_z}$ between the two links $L_B$ 16 and $L_D$ 26 around their common $\hat{Z}_B^W, \hat{Z}_D^W$ axes $(\theta_{BD_z}=0)$.

Figure 20:
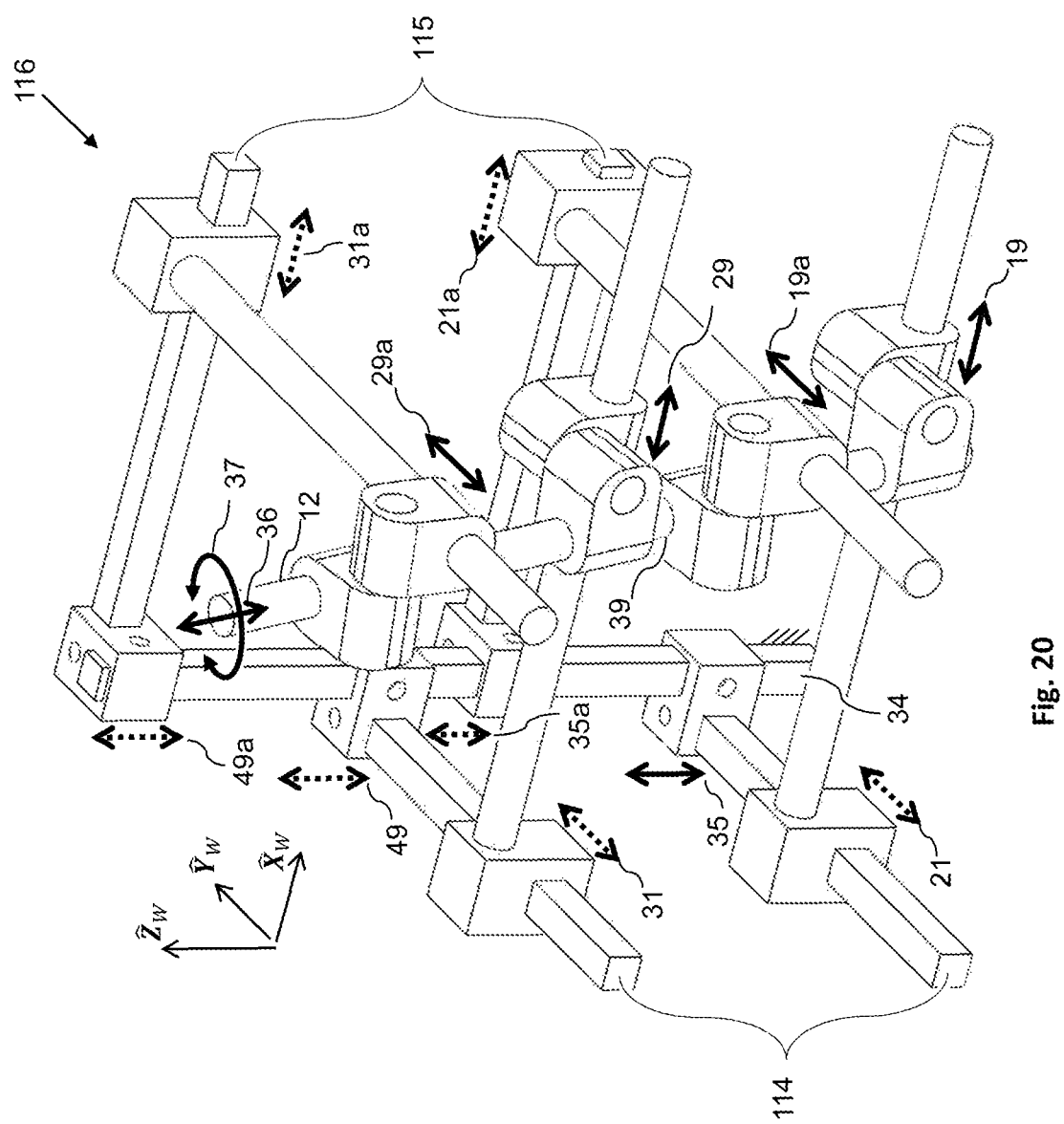
FIG. 20. Parallel connected coupled Cartesian manipulator composed of the hybrid serial-parallel coupled Cartesian manipulators of FIGS. 18, 19.

FIG. 20 is a 3D view of a parallel connected coupled Cartesian manipulator 116 of the present teachings. Manipulator 116 comprises parallel joint axes manipulator 114 of FIG. 18 and parallel joint axes manipulator 115 of FIG. 19 joined by common tool-link $L_T$ 12. The two parallel joint axes manipulator embodiments 114 and 115 are perpendicular to each other, so that a rotary joint 39 collinear with the tool-link 12 axis $\hat{Z}_T$, is required to accommodate the relative twist angle $\theta_{BD_z}$ of all the links along tool-link 12 around their common $\hat{Z}_T$ axis. Linear actuators 19, 19a, 29, 29a manipulate tool-link $L_T$ 12 with 4-DOF, i.e. translation along and rotation around axes $\hat{X}_W$ and $\hat{Y}_W$. Linear actuators 19, 19a, 29, 29a connect in parallel from common rail-link 34 to the tool-link 12. At one end linear actuators 19, 19a, 29, 29a connect to link 34 through prismatic joints 21, 21a, 31, 31a respectively. At the other end linear actuators 19, 19a, 29, 29a connect to tool-link 12 through link-pairs each with two revolute joints. Additional linear actuator 35, in series with linear actuators 19, 19a, 29, 29a, implements 5-DOF control of the tool-link 12. If the distances between the links along the tool-link 12 are fixed then the links along rail-link 34 must be variable via prismatic joints 35a, 49, 49a to accommodate changes in distance as the tool-link 12 orientation changes. Alternatively, either one of prismatic joints 35a, 49, 49a may be actuated and the remaining 35a, 49, 49a joints are passive. If the distances between the links along rail-link 34 are fixed then the links along tool-link 12 must be free to slide on passive prismatic joints to accommodate changes in distance between the links as the tool-link 12 orientation changes. If one of the prismatic joints 35, 35a, 49, 49a is fixed then 5-DOF control of the tool-link 12 may be implemented with tool-link linear actuator 36. 6-DOF control of the tool-link 12 may be implemented with addition of tool-link rotary actuator 37. Up to three additional rail-links, not shown, like 34 can be added in adjacent corners for structural support of the manipulator, along with associated rail-links like 20, 20a, 30, 30a and associated links like 41, 41a, 61, 61a, 48, 48a.

Figure 21:
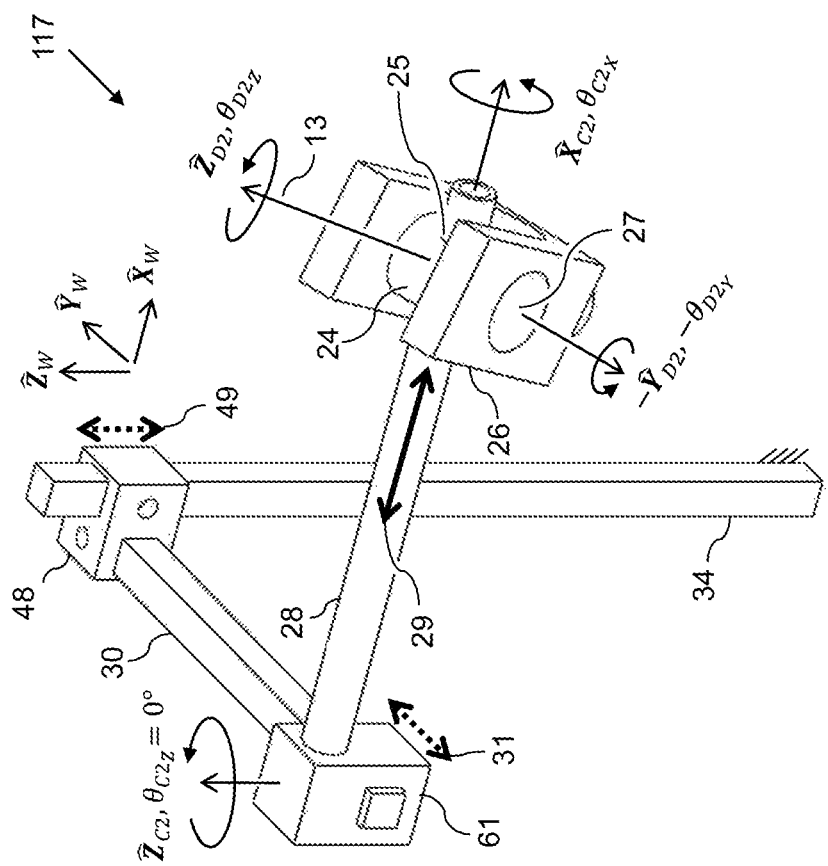
FIG. 21. One of four similar components of a parallel connected coupled Cartesian manipulator with intersecting revolute joint axes.

FIG. 21 is a 3D view of one of four similar components 117 of a parallel connected coupled Cartesian manipulator with intersecting revolute joint axes $\hat{X}_{C2}, \hat{Y}_{D2}, \hat{Z}_{D2}$ respectively numbered as 25, 27, 13 with respective angular rotation angles $\theta_{C2_x}, \theta_{D2_y}, \theta_{D2_z}$. Link $L_{C2}$ 24 connects to rail-link 28 with coaxial revolute-prismatic (cylindrical) joint 25 that enables rotation angle $\theta_{C2_x}$ around rail-link 28 and linear displacement coordinate $x_{C2}^W$ along rail-link 28. Linear actuator 29 enables motion of link $L_{C2}$ 24 concentric with rail-link 28. Link $L_{D2}$ 26 connects to link $L_{C2}$ 24 through common revolute joint 27 that enables rotation angle $\theta_{D2_y}$. Link $L_{D2}$ 26 couples to the tool-link, not shown. Revolute joint 27 may be implemented by two separate rotary bearings on opposite, sides of rail-link 28 to symmetrically distribute the load applied by linear actuator 29 concentric with rail-link 28. Link 26 couples to the adjacent corresponding links 26 of the other similar components 117 through revolute joint 13 that enables rotation displacement angle $\theta_{BD_z}$ around axis $\hat{Z}_{D2}$. Revolute joint 13 may be implemented with two separate rotary bearings on opposite sides of link 24 to symmetrically distribute the load applied by linear actuator 29 concentric with rail-link 28. Revolute joint 13 accommodates relative twist angle between other coaxial links 16 in FIG. 23 along the tool-link axis $\hat{Z}_T$. Linear actuator 29 connects to link 26 through 3-DOF revolute joints. Link 61 moves along rail-link 30 via prismatic joint 31 depicted by a heavy dashed double-headed arrow. The position of link 48 may be free to slide in the $\hat{Z}_W$ direction along rail-link 34 as depicted by heavy dashed double-headed arrow 49. For illustration, only one rail-link 34 is shown, but actual applications may have additional rail-links like 34 and additional links like 48a supporting the other end of rail-links like 30.

Figure 22:
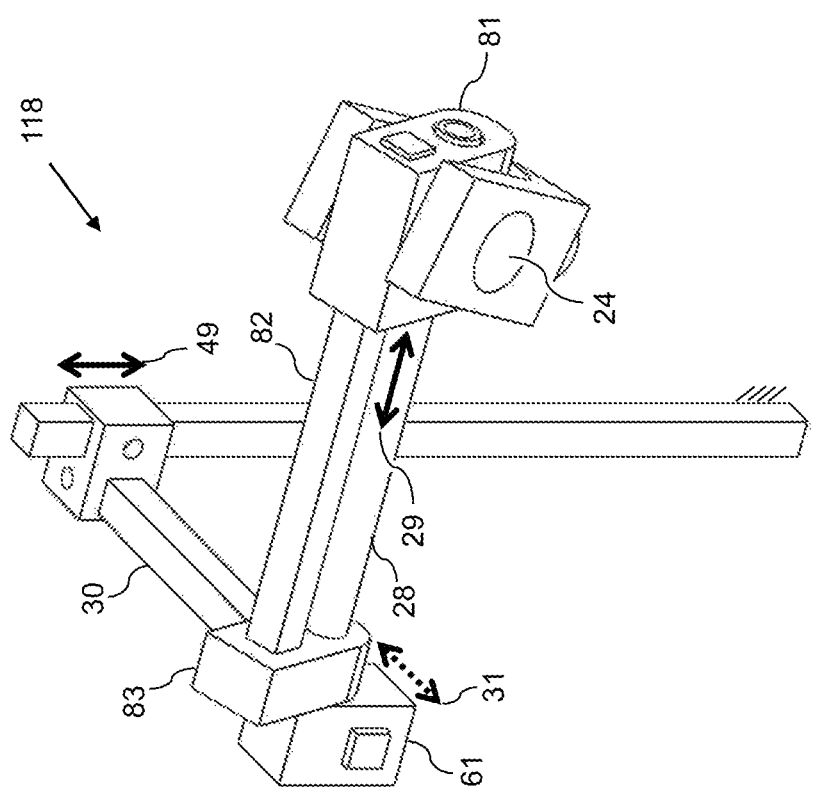
FIG. 22. The component from FIG. 21, together with additional structural support components.

FIG. 22 is a 3D view of the component 118 from FIG. 21, together with structural support components 81, 82, 83. Structural support components 81, 82, 83 provide additional structural support for the tool-link that may be required to support the weight of the manipulator or to support other loads for applications, like machining for example, that transmit loads from linear actuator 49 to a machine tool attached to the tool-link. Structural support components 81, 82, 83 may not be required for components 116 that are supported by passive prismatic joints on rail 34 as depicted by the heavy dashed double-headed arrow 49 in FIG. 21. Structural support components 81, 82, 83 support external loads on the tool-link without transferring those loads to rail-link 28. This is useful for implementations of component 117 that use linear actuators 29 like cables, ball screws or linear motors, which do not support lateral or moment loads. Link 24 rigidly connects to link 81 that is free to move, via a prismatic joint, along rail-link 82. Rail-link 82 rigidly connects to link 83. Link 83 connects to link 61 through a revolute joint that is concentric with rail-link 28. Link 81 is not connected to rail-link 28 therefore, it transmits forces to the tool-link in a parallel-connection with linear actuator 29. In other words, the force transmission path from link 61 through links 81, 82, 83 acts in a parallel-connection with the force transmission path through link 28. For illustration, only one link 83 is shown, but in actual applications, rail-link 82 would typically be supported at both ends by two opposing links 83, 83a. Only one rail-link 82 is shown, but two parallel links 82, 82a may be used to support the two ends of link 24.

Figure 23:
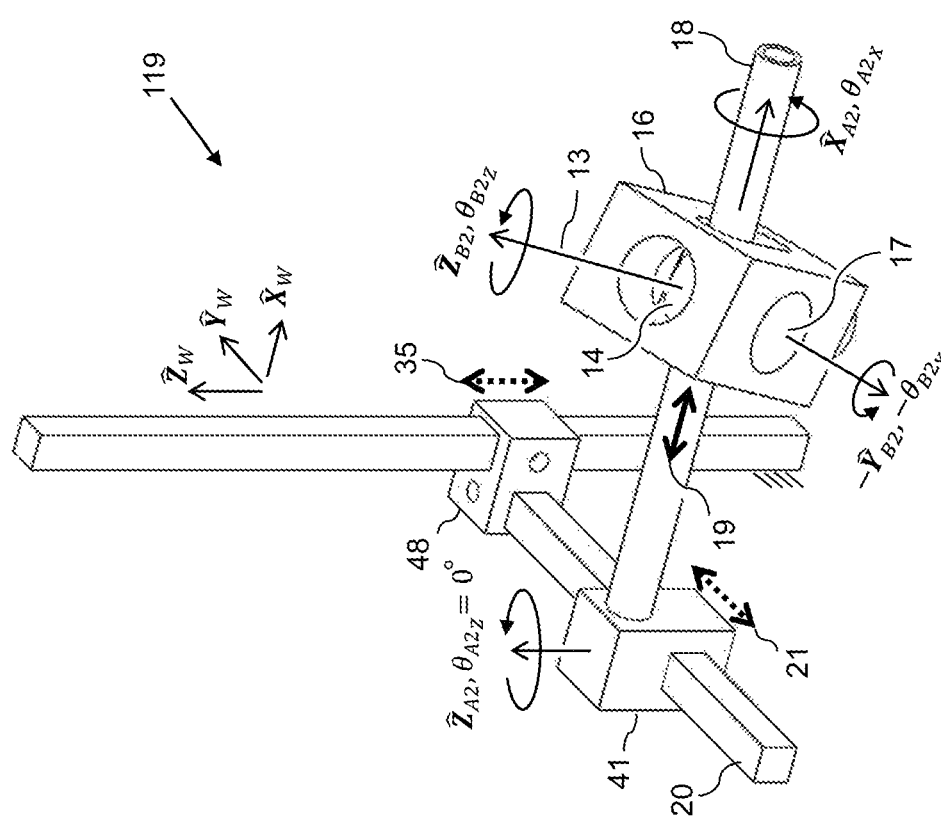
FIG. 23. One of four similar components of a parallel connected coupled Cartesian manipulator that is complimentary to the one in FIG. 21.

FIG. 23 is a 3D view of one of four similar components 119 of a parallel connected coupled Cartesian manipulator with intersecting revolute joint axes. It is complimentary to component 117 in FIG. 21. Here, link $L_{B2}$ 16 has rotary bearings on both sides along rotation axis $\hat{Z}_{B2}$ to couple to adjacent links 16, 26 along the tool-link axis, of other similar components 117, 118 of the parallel connected coupled Cartesian manipulator with intersecting revolute joint axes.

Figure 24:
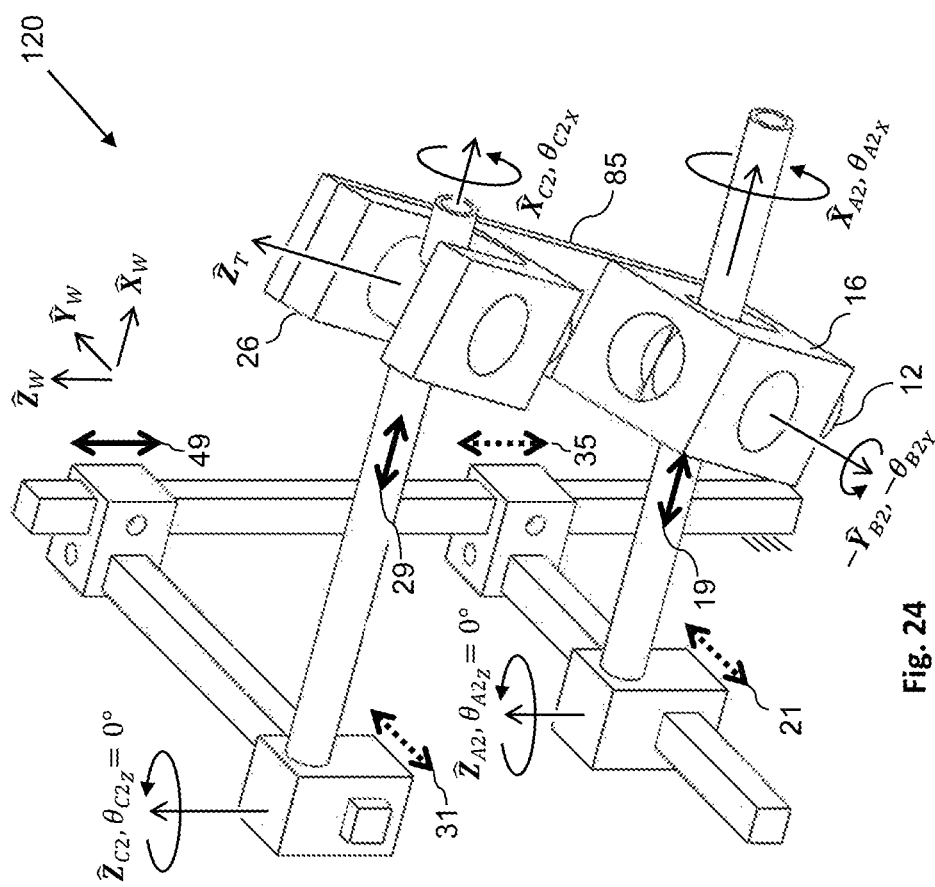
FIG. 24. Hybrid serial-parallel, multi degrees-of-freedom, coupled Cartesian manipulator that is composed of the components of FIGS. 22, 23, coupled together with a connector.

FIG. 24 is a 3D view of a hybrid serial-parallel, coupled Cartesian manipulator 120 of the present teachings, that is composed of component 117 of FIG. 21 and component 119 of FIG. 23 coupled together with connector 85. This is a 'parallel joint axes, with fixed-distance', hybrid serial-parallel coupled Cartesian manipulator, with links 16, 26 and connector 85 forming a single rigid body tool-link 12 along the $\hat{Z}_T$ axis. Only one connector 85 is shown in FIG. 24. Typically, there is an opposing, connector 85a, not shown, for symmetrical load distribution for structural integrity. The two opposing connectors 85, 85a symmetrically distribute the loads applied by linear actuators 19, 29.

Figure 25:
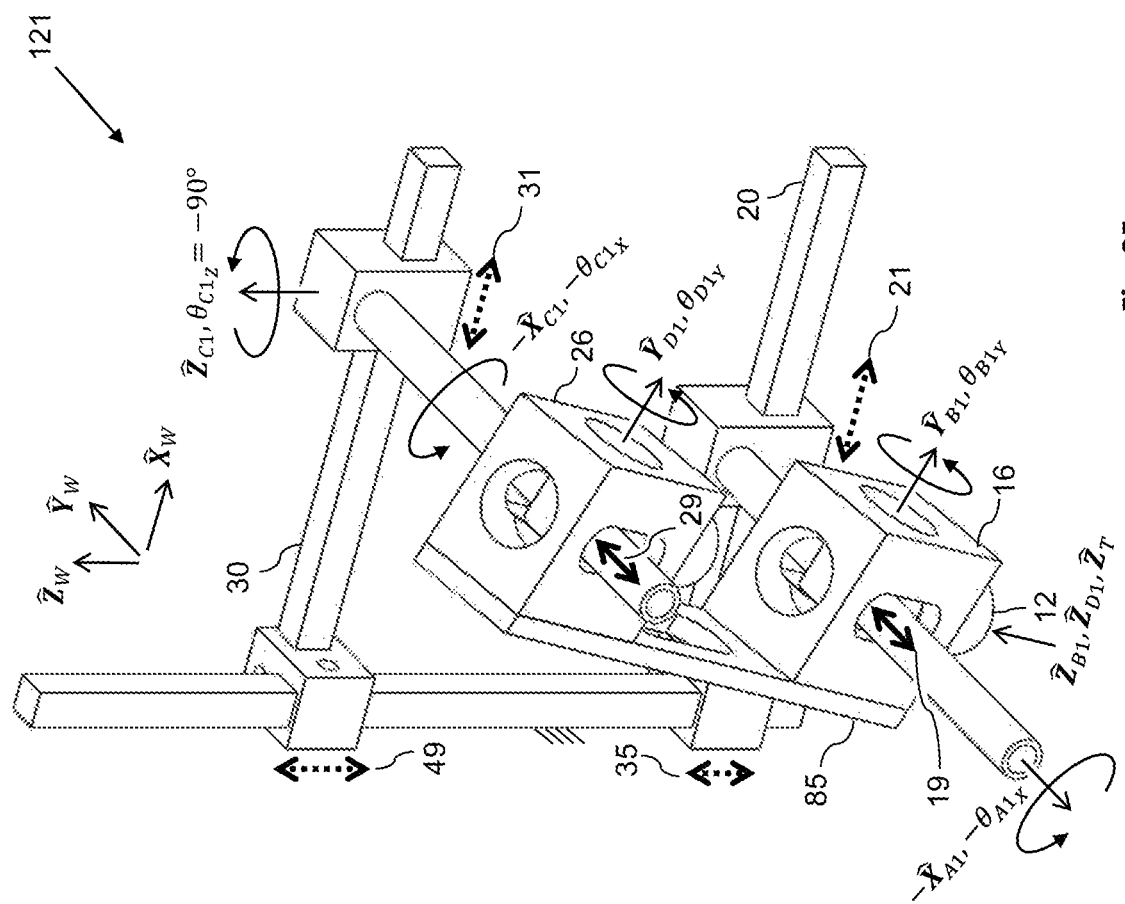
FIG. 25. 'Parallel joint axes, with fixed-distance', hybrid serial-parallel coupled Cartesian manipulator with intersecting revolute joint axes rotated −90° relative to the manipulator in FIG. 24.

FIG. 25 is a 3D view of a 'parallel joint axes, with fixed-distance', hybrid serial-parallel coupled Cartesian manipulator 121 with intersecting revolute joint axes rotated −90° around the $\hat{Z}_{C1}$ axis relative to manipulator 120 in FIG. 24. Manipulator 121 is similar to manipulator 120 in FIG. 24 except that both links $L_{B1}$ 16 and $L_{D1}$ 26 have rotary bearings on both sides along rotation axis $\hat{Z}_T$ to couple to the links of the adjacent parallel joint axes manipulator. Note that links 16, 26 are rectangular in manipulator embodiments 120, 121 with the longer side of the rectangle in the $\hat{Y}_{B1}$ direction and the connector 85 attached to the shorter side of the rectangle. This allows 120, 121 to be joined together without interference. Alternatively, the connector 85 may be attached to the other face, 90° around the $\hat{Z}_T$ axis of links 16, 26. In this case, the connector 85 has two slots to accommodate motion of rail-links 18, 28. Furthermore, in this case, the shorter sides of rectangular links 16, 16a are in the $\hat{Y}_{B1}$ direction.

Figure 26:
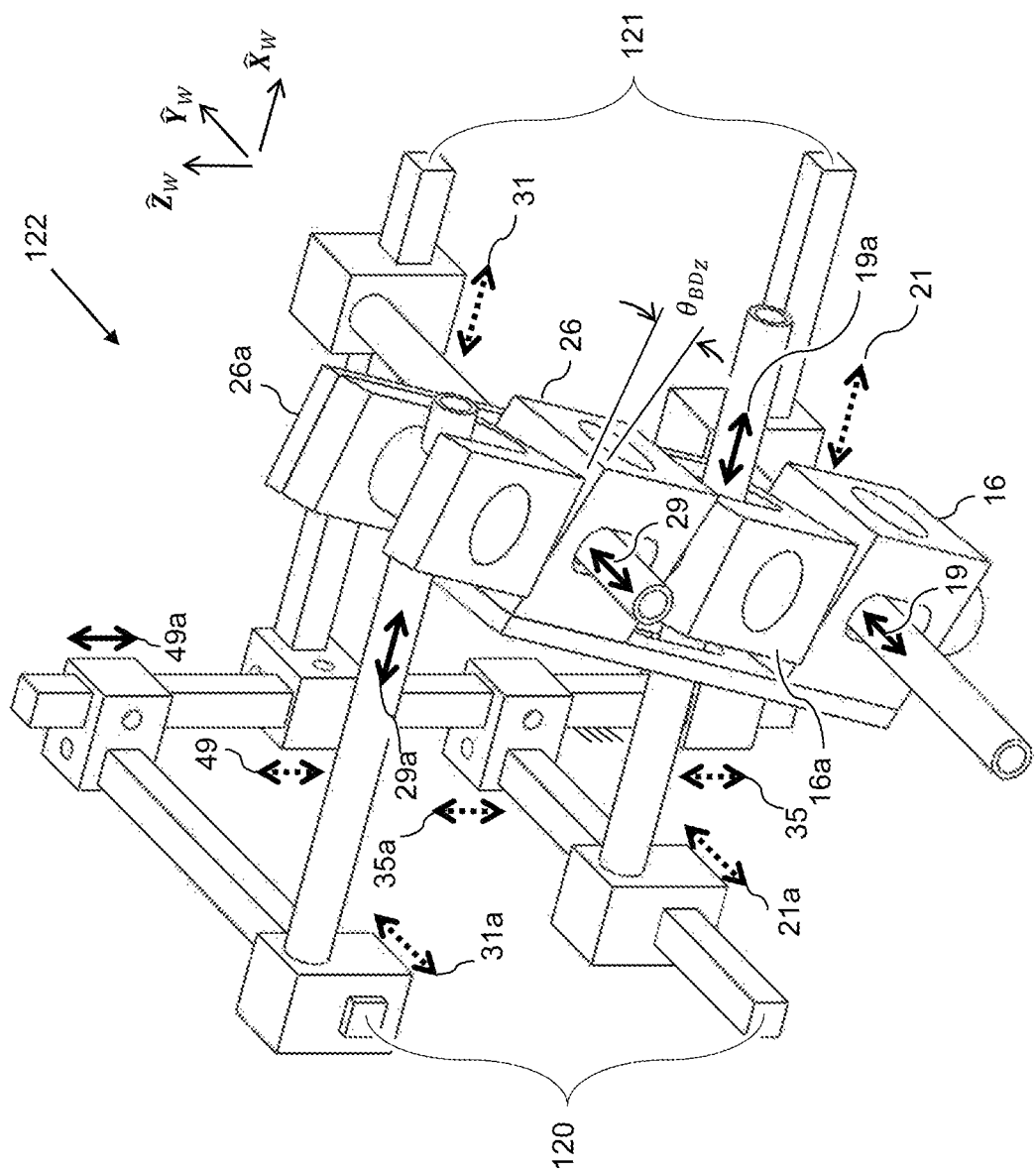
FIG. 26. Parallel connected coupled Cartesian manipulator composed of two 'parallel joint axes, with fixed-distance', hybrid serial-parallel coupled Cartesian manipulators of FIGS. 24, 25, joined together, with a revolute joint, along the common tool-link axis, and with intersecting revolute joint axes.

FIG. 26 is a 3D view of a parallel connected manipulator 122 composed of one 'parallel joint axes, with fixed-distance', coupled Cartesian manipulator 120 of FIG. 24, and one 'parallel joint axes, with fixed-distance', coupled Cartesian manipulator 121 of FIG. 25 joined together, with a revolute joint, along the common tool-link axis $\hat{Z}_T$. The two parallel joint axes coupled Cartesian manipulator embodiments 120, 121 interleave in FIG. 26. Link 16a of parallel joint axes manipulator 120 is between the two corresponding links 16, 26 of parallel joint axes manipulator 121, and link 26 of parallel joint axes manipulator 121 is between the two corresponding links 16a, 26 of parallel joint axes manipulator 120. There is a relative twist angle $\theta_{BD_Z}$ along the tool-link $\hat{Z}_T$ axis, between manipulator embodiments 120 and 121 since they are perpendicular to each other. Rotary bearings, on each side of links 16a, 26 accommodate the relative twist angle $\theta_{BD_Z}$. This arrangement distributes the revolute joint, between 120 and 121 among three separate collinear rotary bearings, spaced far apart from each other, for high inherent bending stiffness. It also symmetrically distributes the forces applied by linear actuators 19, 29, 19a, 29a. The rotary bearing between links 16a, 26 may be omitted to avoid over constraining three collinear rotary bearings along the tool-link $\hat{Z}_T$ axis. The two parallel joint axes manipulator embodiments 120, 121 could also be connected together end-to-end with a single rotary bearing between them; however, this arrangement is less inherently stiff compared to the interleaved implementation of FIG. 26 with separated rotary bearings along the tool-link $\hat{Z}_T$ axis.

Figure 27:
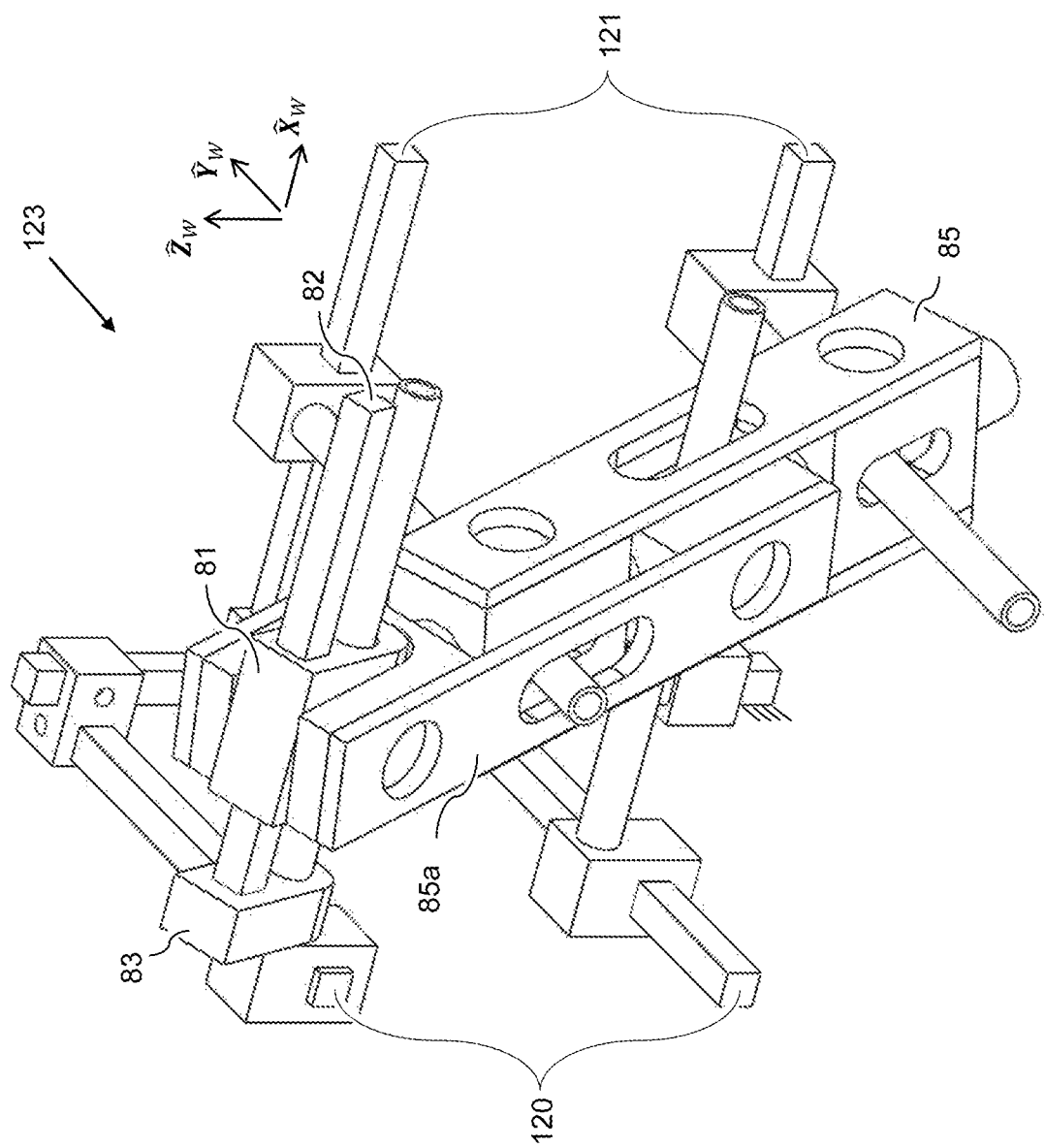
FIG. 27. Parallel connected coupled Cartesian manipulator that is similar to the manipulator in FIG. 26, with additional structural support components.

FIG. 27 is a 3D view of a parallel connected manipulator 123 that is similar to manipulator 122 in FIG. 26, composed of two parallel joint axes coupled Cartesian manipulator embodiments 120, 121 each with intersecting revolute joint axes; and with the addition of structural support components 81, 82, 83 and opposing connectors 85, 85a for structural support.

Pairs of revolute joints, pairs of prismatic joints, and combination of joints can be considered as coupling links or linkages. Tool-links and links about which joints move or revolve can be considered as rails.

Applications:

Applications for the present teachings are independent of scale: from large cranes down to small nanofabrication manipulators, for example. The manipulator is suitable for subtractive machining processes like, milling, drilling, or laser cutting. It is also suitable for additive processes such as painting or 3D printing. Robotic applications include assembly or welding for example. The manipulator is suitable for motion simulator platforms. Sensing applications include 6 DOF joysticks or 3D shape determination. The axes of the manipulator do not have to be driven by actuators. For example, the manipulator enables manual operations such as cutting or sawing along straight lines at prescribed angles. Tools that can be connected to the manipulator, of the present teachings, may include but are not limited to the following: saw, screw driver, hammer, wrench, linear actuator, rotary actuator, combined linear-rotary actuator, spindle, motorized spindle, subtractive machining tool, drill, end mill, router, brush, scraper, grinder, sander, polisher, riveter, stapler, shovel, pick, rake, jackhammer, knife, scalpel, surgical instrument, needle, pen, pencil, paint brush, paint sprayer, air brush, hose, spray gun, glue gun, liquid dispenser, glue dispenser, mirror, light, laser, imager, camera, microscope, microscope objective, electrical probe, wire bonder, soldering tip, welding rod, welding torch, plasma torch, wire EDM, laser cutter, water jet, print head, additive machining tool, 3D printer head, inkjet print head, pipette tips, end effector, grabber, claw, robotic hand, electromagnet, pick-and-place tool, vacuum chuck, proximity sensor, position sensor, contact sensor, force sensor, torque sensor, joystick or motion simulation platform.

Implementation:

Overview. The manipulator $In_{Sm}$ in FIG. 11 is designed for 5-axes milling applications. A machining spindle is rigidly attached to the tool-link $L_T$. Four horizontal ball screw actuators control the 4-DOF position and orientation of the tool-link $L_T$. The manipulator has intersecting joint axes so the ball screw actuators' axial forces directly transmit to the tool-link without imparting radial or moment loads to the ball screw nuts. Furthermore, the ball screws directly control points on the tool-link axis that are in line with the ball screws, for precise positioning and orientation control of the tool-link. The structure is constructed from hollow steel sections. It is stiff to support cutting forces with minimal deflection. Manipulators for other machining applications, like laser or plasma cutting, do not contact the work piece so they can be lighter for fast, agile motion control. They may be constructed from lighter weight materials such as aluminum or carbon fiber.

Ball screw actuators. Four horizontal ball screw actuators control the 4-DOF position and orientation of the machine spindle. Two vertical ball screw actuators, at opposite corners, control the vertical position of the base platform for overall 5-DOF control. Weight, inertial forces and dynamic friction apply radial loads to the four horizontal ball screw actuators. Radial loads on ball screws adversely affect their life. However, design and operational considerations of the present manipulator reduce radial loads to less than 1% of the axial dynamic load rating of the ball screws. A load support link supports the weight of the joints and links along the tool-link as well as forces from the machining spindle's interaction with the work piece. Horizontal beams support the ends of the ball screw shafts on linear rails. Air cylinders compensate the constant weight of the horizontal support beams. However, they do not support the variable inertial forces as the tool-link orientation changes. The horizontal support beams move up or down as the tool-link orientation angle $\theta_p$ changes, where $\theta_p$ is the tool-link polar angle, measured from the vertical $\hat{Z}_W$ axis. The vertical acceleration $\ddot{z}_A^W$ of the horizontal support beams as a function of the polar angle velocity $\dot{\theta}_p$ and acceleration $\ddot{\theta}_p$ is, $$\ddot{z}_{A1}^W = z_{AS}{}^T(\ddot{\theta}_p \sin(\theta_p) + \dot{\theta}_p{}^2 \cos(\theta_p)) \quad (16)$$

where $z_{A1}{}^T$ is the distance along the tool-link from frame $F_T$ to the link $L_{A1}$. For example, $z_{A1}{}^T$=0.75 (m) for the manipulator $In_{sm}$ in FIG. 11. Eq. (1) determines the limits for angular acceleration $\ddot{\theta}_p$ and angular velocity $\dot{\theta}_p$ of the tool-link. For example, at a polar angle $\theta_p$=0°, angular velocities $\dot{\theta}_p$<0.4 (rad/s²) impart $$\ddot{z}_A^W < 0.1 \left(\frac{m}{s^2}\right)$$

acceleration to the horizontal support beam, resulting in radial force of less than ~1% of the horizontal support beams' weight $$m*9.8\left(\frac{kg*m}{s^2}\right)$$

imparted to the ball screw due to the inertia of its mass m (kg).

Ball screw nut adjustment angle. The ball screw nuts rotate around their rotation axes, as the tool-link orientation changes, causing linear position displacements along the ball screw. Therefore, the manipulator control software must adjust the ball screw angular position commands to compensate for the nuts' rotations. For example, link $L_{A1}$ ball screw nut rotates by angle $\theta_{A1_X}$. Equation (6) gives angle $\theta_{A1_X}$ as a function of the tool-link $L_T$ orientation unit vector $\hat{Z}_T^W$. Ball screw nut adjustment angles $\theta_{C1_X}$, $\theta_{A2_X}$, $\theta_{C2_X}$ for the other links $L_{C1}$, $L_{A2}$, $L_{C2}$ are calculated in the same way. The control software must adjust ball screw angular position commands by these angles, due to the orientation of the tool-link.

Components. The manipulator, of the present teachings, can be implemented using standard mechanical, electrical and control components such as, fasteners, bearings, actuators, motors, sensors, controllers, etc.

Joints. Standard components such as linear bearings or bushings can be used for the prismatic joints of the manipulator, of the present teachings. Standard components such as ball bearings, bushings or flexures can be used for the revolute joints. Combined revolute-prismatic bearings or bushings can be used for combined coaxial revolute-prismatic (cylindrical) joints. Spherical joints can be implemented using rod ends. Universal joints can be used for rotational link-pairs with two intersecting axes.

Actuators. Possible linear actuators for the manipulator, of the present teachings, include, but are not limited to the following: belt drive, chain drive, cable drive, ball screw, lead screw, ball spline, ball screw spline, friction drive, rack and pinion gear, linear motor, pneumatic cylinder, hydraulic cylinder, electrohydraulic cylinder, rodless cylinder, piezoelectric drive. There are also non-actuated applications for the manipulator. For example, a manipulator can be setup for manual operation to enable precise cuts along straight lines at prescribed angles. In addition, a manipulator can be used to measure manual inputs from a joystick or position sensor connected to the tool-link.

What is claimed is:

1. A manipulator system comprising:
   a positioner having a primary rail, a first coupling linkage, and a second coupling linkage, said first coupling linkage coupling said primary rail to a base and positioning said primary rail and said second coupling linkage along a first plane;
   another positioner having a secondary rail, a third coupling linkage, and a fourth coupling linkage, said third coupling linkage coupling said secondary rail to the base and positioning said secondary rail and said fourth coupling linkage along a second plane parallel to the first plane; and
   a common link coupling to said primary and secondary rails via said second and fourth coupling linkages, the common link defining a longitudinal axis that intersects the first plane and the second plane;
   each of said second and fourth coupling linkages including a joint for linear motion along the respective rail and rotational motion around the respective rail, and a revolute joint for relative pivoting between the respective rail and said common link;
   wherein a position and orientation of said common link relative to the base is adjustable by said joints and said revolute joints.

2. The manipulator system of claim 1, wherein:
   each of said second and fourth coupling linkages includes a joint for linear motion along the common link, wherein the position and orientation of said common link relative to the base is adjustable by said joints for linear motion along the common link.

3. The manipulator of claim 1, wherein the primary rail and secondary rail are parallel.

4. The manipulator system of claim 1, further comprising a tool mounted to said common link.

5. The manipulator system of claim 1, further comprising a support fixed to the base and connected to said first and third coupling linkages.

6. The manipulator system of claim 5, wherein said first coupling linkage is adjustable to move said primary rail relative to the base.

7. The manipulator system of claim 6, wherein said first coupling linkage includes a joint that provides linear motion of said primary rail along said support.

8. The manipulator system of claim 7, wherein said joint of said first coupling linkage provides rotational motion of said primary rail around an axis of said support.

9. The manipulator system of claim 5, wherein said third coupling linkage is adjustable to move said secondary rail relative to the base.

10. The manipulator system of claim 9, wherein said third coupling linkage includes a joint that provides linear motion of said secondary rail along said support.

11. The manipulator system of claim 10, wherein said joint of said third coupling linkage provides rotational motion of said secondary rail around an axis of said support.

12. The manipulator system of claim 5, further comprising a second support fixed to the base.

13. The manipulator system of claim 12, wherein said second support is parallel to said support.

14. The manipulator system of claim 1, wherein said positioner includes at least two primary rails, a first primary rail that is connected to the base via said first coupling linkage, and a second primary rail that is connected to said common link via said second coupling linkage, wherein a joint couples the first and second primary rails together such that said second primary rail is movable along said first primary rail.

15. The manipulator system of claim 14, wherein said joint coupling the first and second primary rails together is a prismatic joint that provides linear motion of said second primary rail along said first primary rail.

16. The manipulator system of claim 14, wherein said joint coupling the first and second primary rails together includes a prismatic joint that provides linear motion of said second primary rail along said first primary rail, and a revolute joint that provides rotational motion of said second primary rail around an axis of said revolute joint.

17. The manipulator system of claim 16, wherein said joint further includes a second prismatic joint that said second primary rail is free to slide through, wherein the position of said second prismatic joint is adjustable along said second primary rail.

18. The manipulator system of claim 14, wherein said positioner further includes a third primary rail that is connected to the base via a second support, wherein a joint couples the third and second primary rails together such that said second primary rail is movable along said third primary rail and said first primary rail is parallel to said third primary rail.

19. The manipulator system of claim 18, wherein the joint that couples the third primary rail and the second primary rail together includes a revolute joint for pivoting motion between the third primary rail and the second primary rail.

20. The manipulator system of claim 14, wherein said another positioner includes at least two secondary rails, a first secondary rail that is connected to the base via said third coupling linkage, and a second secondary rail that is connected to said common link via said fourth coupling linkage, wherein a joint couples the first and second secondary rails together such that said second secondary rail is movable along said first secondary rail.

21. The manipulator system of claim 20, wherein said joint coupling the first and second secondary rails includes a prismatic joint that provides linear motion of said second secondary rail along said first secondary rail.

22. The manipulator system of claim 20, wherein said joint coupling the first and second secondary rails together includes a prismatic joint that provides linear motion of said second secondary rail along said first secondary rail, and a revolute joint that provides rotational motion of said second secondary rail around an axis of said revolute joint.

23. The manipulator system of claim 22, wherein said joint further includes a second prismatic joint that said second secondary rail is free to slide through, wherein the position of said second prismatic joint is adjustable along said second secondary rail.

24. The manipulator system of claim 20, wherein said another positioner further includes a third secondary rail that is connected to the base via a second support, wherein another joint couples the second and third secondary rails together such that said second secondary rail is movable along said third secondary rail and said first secondary rail is parallel to said third primary rail.

25. The manipulator system of claim 20, wherein said first primary rail and said first secondary rail are parallel, and said second primary rail and said second secondary rail are parallel.

26. A manipulator system comprising:
a positioner having a first primary rail, a second primary rail, a first coupling linkage, a second coupling linkage, and a third coupling linkage, said first coupling linkage coupling said first primary rail to a base, the third coupling linkage connecting the second primary rail to the first primary rail and positioning said second primary rail and said second coupling linkage along a first plane;
another positioner having a first secondary rail, a second secondary rail, a fourth coupling linkage, a fifth coupling linkage, and a sixth coupling linkage, said fourth coupling linkage coupling said first secondary rail to the base, said sixth coupling linkage coupling the first secondary rail to the second secondary rail and positioning said second secondary rail and said fourth coupling linkage along a second plane parallel to the first plane;
a common link coupling to said second primary rail and said second secondary rail via said second and fifth coupling linkages, the common link defining a longitudinal axis that intersects the first plane and the second plane;
the third coupling linkage including a prismatic joint for linear motion of the second primary rail along the first primary rail, and the sixth coupling linkage including a prismatic joint for linear motion of the second secondary rail along the first secondary rail;
the first coupling linkage having a prismatic joint for linear motion of the first primary rail along a support, and the fourth coupling linkage having a prismatic joint for linear motion of the first secondary rail along the support;
each of said second and fifth coupling linkages including a joint for linear motion along the respective rail and rotational motion around the respective rail, and a revolute joint for relative pivoting between the respective rail and said common link;
wherein the second primary rail and the second secondary rail are parallel;
wherein the revolute joint of the second coupling link has a revolute axis about which it rotates and the revolute joint of the fifth coupling linkage has a revolute axis about which it rotates, the revolute axis of the second coupling link being parallel to the revolute axis of the fifth coupling linkage;
wherein a position and orientation of said common link relative to the base is adjustable by said joints and said revolute joints.

27. A parallel connected manipulator system comprising:
a primary manipulator system;
a secondary manipulator system;
said primary manipulator system connected in parallel with said secondary manipulator system via a support, wherein a coupling linkage of said primary manipulator system connects to the support between two coupling linkages of said secondary manipulator system, wherein one of the two coupling linkages of said secondary manipulator system connects to the support between the coupling linkage of said primary manipulator and another coupling linkage of said primary manipulator system;
a common link of said primary manipulator system coupling to a common link of said secondary manipulator system, forming a connected common link, wherein a twist angle is allowable between said common link of said primary manipulator system and said common link of said secondary manipulator system;
the support connecting said primary manipulator system and said secondary manipulator system to a base;
wherein said base is movable along said support.

* * * * *